United States Patent
Malloy Desormeaux et al.

(10) Patent No.: US 6,308,016 B1
(45) Date of Patent: Oct. 23, 2001

(54) VERIFING CAMERA WITH DEMONSTRATION MODE AND METHOD

(75) Inventors: Stephen G. Malloy Desormeaux, Rochester; Robert Hills, Spencerport; David L. Funston, Batavia, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/493,787

(22) Filed: Jan. 28, 2000

(51) Int. Cl.[7] ................................................. G03B 17/00
(52) U.S. Cl. ................................. 396/284; 396/374
(58) Field of Search .................................... 396/284, 281, 396/287, 429, 374; 348/64

(56) References Cited

U.S. PATENT DOCUMENTS

| | | | |
|---|---|---|---|
| 4,697,900 | * 10/1987 | Eguchi et al. | 396/284 |
| 5,745,798 | * 4/1998 | Hirasawa | 396/374 X |
| 5,950,031 | * 9/1999 | Yamagata | 396/429 |

\* cited by examiner

Primary Examiner—W.B. Perkey
(74) Attorney, Agent, or Firm—Robert Luke Walker

(57) ABSTRACT

A method demonstrates a film-unloaded verifying camera in response to shutter button actuation. In the method, an electronic image is captured and the electronic image is shown to the user along with an indicator that film is not loaded. The film shutter can optionally be fired to provide a more complete experience of camera use. A camera provides these features.

15 Claims, 23 Drawing Sheets

VERIFING CAMERA WITH DEMONSTRATION MODE AND METHOD

CROSS REFERENCE TO RELATED APPLICATIONS

Reference is made to commonly assigned co-pending U.S. patent applications Ser. No. 09/491,831, entitled: VERIFYING CAMERA HAVING FOCUS INDICATOR AND METHOD, and filed in the name of Stephen G. Malloy-Desormeaux; Ser. No. 09/493,442, entitled: MOTION VERIFYING CAMERA AND MOTION VERIFYING PHOTOGRAPHY METHOD, and filed in the names of Hirohiko Ina, Hisanori Hoshikawa, and David L. Funston; Ser. No. 29/117,761, entitled: VERIFYING FLASH CAMERA, and filed in the name of Frederick J. Reber, U.S. Pat. No. D433,047.

FIELD OF THE INVENTION

The invention relates to photography and to electronic-film cameras and more particularly relates to a verifying camera having a demonstration mode and a related method.

BACKGROUND OF THE INVENTION

It has been a common practice in selling cameras to let potential customers handle the cameras. This has sometimes included "dry-firing" the cameras, that is, shooting pictures without film. Verifying cameras are a type of hybrid film-electronic camera in which the user has an opportunity to check captured film images immediately after capture using a concurrently recorded electronic image.

It would thus be desirable to provide an improved verifying camera and method in which features of the camera can be demonstrated without film.

SUMMARY OF THE INVENTION

The invention is defined by the claims. The invention, in its broader aspects, provides a method for demonstrating a film-unloaded verifying camera in response to shutter button actuation. In the method, an electronic image is captured and the electronic image is shown to the user along with an indicator that film is not loaded. The film shutter can optionally be fired to provide a more complete experience of camera use. A camera provides these features.

It is an advantageous effect of at least some of the embodiments of the invention that an improved verifying camera and method in which features of the camera can be demonstrated without film.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
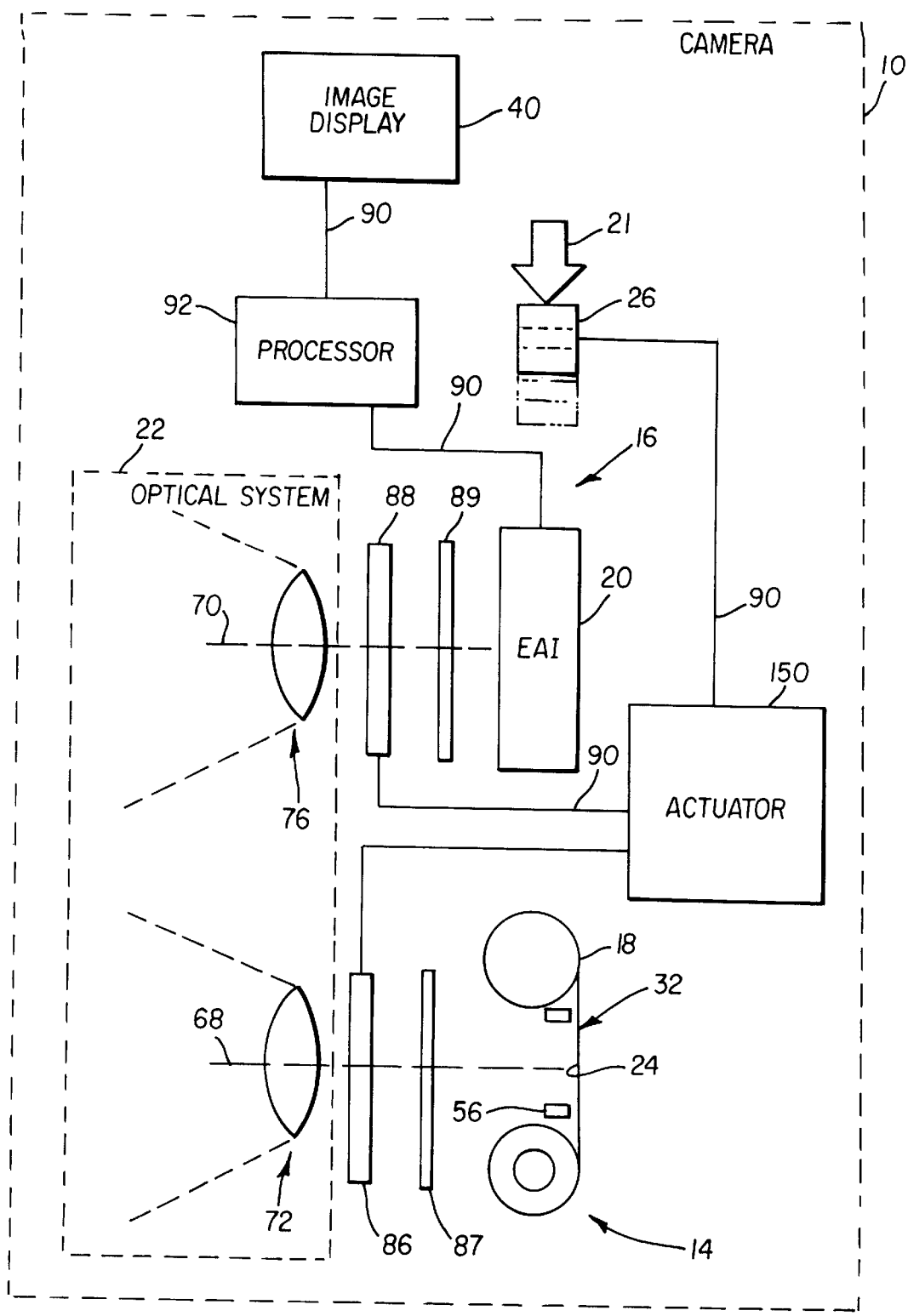
FIG. 1 is a simplified diagrammatical view of an embodiment of the verifying camera.
Figure 2:
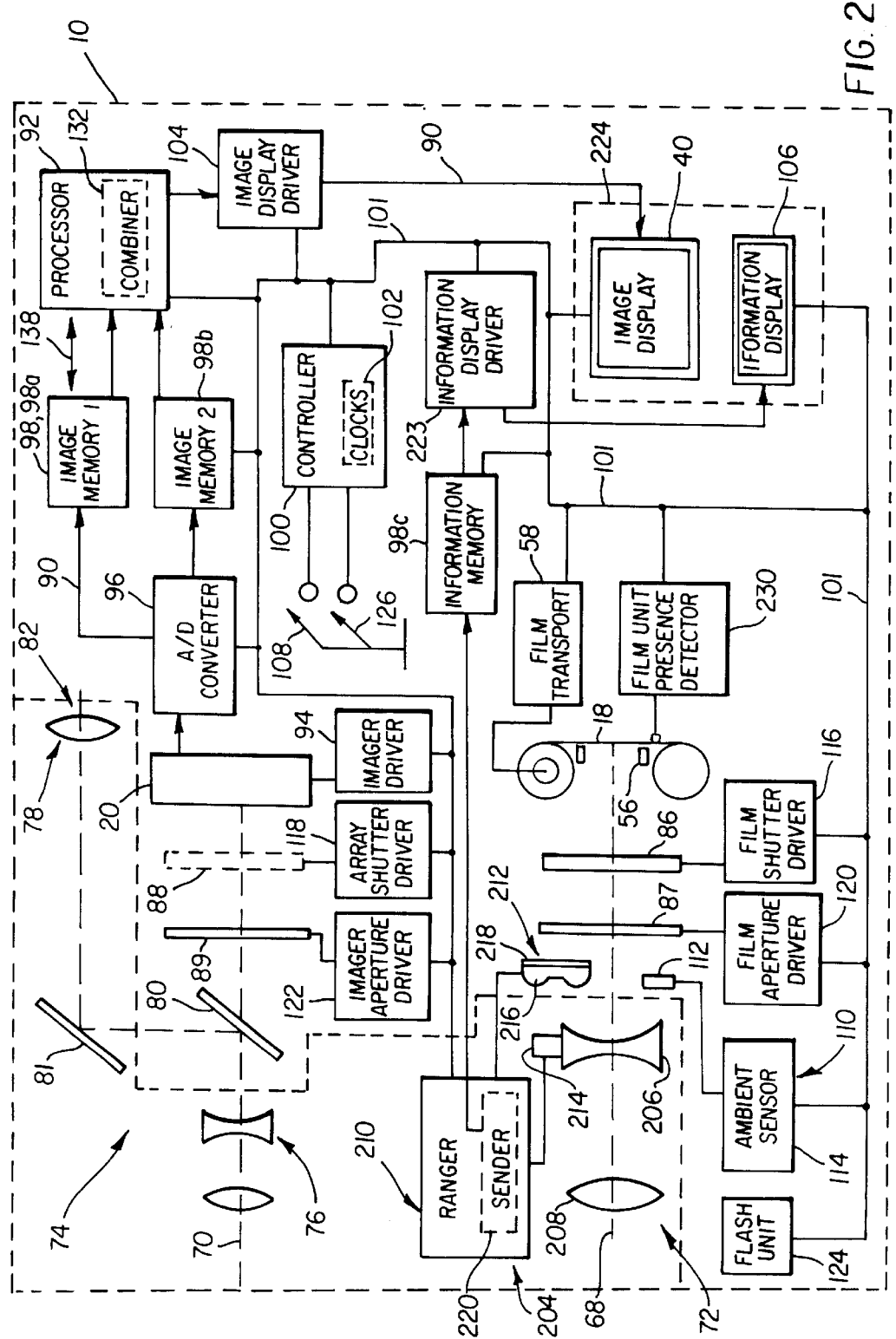
FIG. 2 is a more detailed diagrammatical view of the camera of FIG. 1.

Referring now particularly to FIGS. 1–6, the verifying camera 10 has a body 12 that holds a film latent image capture system 14 and an electronic capture system 16. The film latent image capture system 14 captures latent images on a photographic film unit 18 held in the camera body 12. The electronic capture system 16 captures images by photoelectric conversion on an electronic array imager 20. An optical system 22 directs light to both the filmstrip 24 of the film unit 18 and the electronic array imager 20 and, preferably, also provides a viewfinder image to the photographer using the camera 10. (The viewfinder is shown in FIG. 2.) When the photographer trips (indicated by arrow release 26, a subject image (a light image of a scene) is captured as a latent image on a film frame 32 and as a pair of temporally displaced electronic images on the electronic array imager 20. The initial electronic images are digitally processed and combined to provide a resultant electronic image that is shown on an image display 40 mounted to the body 12. Movement of the optical system 22 relative to the subject image 28 or movement of all or part of the subject image 28 is visualized in the image display 40. Hand shake, undesired movement in the scene to be captured, and the like, are made visible to the user; who can then repeat the picture taking event or, in some embodiments, can change the number of photographic prints ordered. Alternatively, the lack of movement or presence of desired movement can be confirmed. Following this confirmation, in appropriate embodiments, the number of photographic prints ordered can also be changed.

The body 12 can be varied to meet requirements of a particular use and for style considerations. It is convenient if the body 12 has front and rear covers 42,44 that are joined together over a chassis 46. Many of the components of the camera 10 can be mounted to the chassis 46. In the embodiment shown in FIGS. 5–6, a film door 48 and flip-up flash unit 50 are pivotably joined to the covers 42,44 and chassis 46.

The type of film unit 18 used is not critical. The embodiment shown in the drawings has an Advanced Photo System ("APS") film cartridge. Other types of one or two chamber film cartridge could also be used and roll film can also be used. It is currently preferred that the camera 10 is reloadable.

The chassis 46 defines a film cartridge chamber 52, a film sup chamber 54, and an exposure frame 56 between the chambers 52,54. The filmstrip 24 is moved by a film transport 58 out of the canister 60 of the film cartridge 50, is wound into a film roll 62 in the supply chamber 54, and is then returned to the canister 60. The film transport 58, as illustrated, includes an electric motor 64 located within a supply spool 66, but other types of motorized transport mechanisms and manual transports can also be used. Filmstrip exposure can be on film advance or on rewind.

The electronic array imager 20 is mounted in the body 12 and is configured so as to capture an electronic image that corresponds to the latent image 30 concurrently captured on the filmstrip. It is currently preferred, to reduce cost and complexity, that the imager 20 has a low resolution relative to latent film image. The type of imager 20 used can vary, but it is highly preferred that the imager 20 be one of the several solid state imagers available. One highly popular type of solid state imager commonly in use is the Charge Coupled Device (CCD). Of the several types of CCD's available, two allow easy electronic shuttering and thereby are preferable in this application. The first of these, the frame transfer CCD, allows charge generation due to photo activity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. It is also possible to use a electronic image sensor manufactured with CMOS technology. This type of imager 20 is attractive for use since it is manufactured easily in a readily available solid state process and lends itself to use with a single power supply. In addition, the process allows peripheral circuitry to be integrated onto the same semiconductor die. A third type of sensor which can be used is a Charge Injection Device (CID). These sensors differ from the others mentioned in that the charge is not shifted out of the device to be read. Reading is accomplished by shifting charge within a pixel. This allows a "non-destructive" read of any pixel in the array. If the device is externally shuttered, the array may be read repeatedly without destroying the image. Shuttering can be accomplished by an external shutter or, without an external shutter, by injecting the charge into the substrate for recombination.

Figure 3:
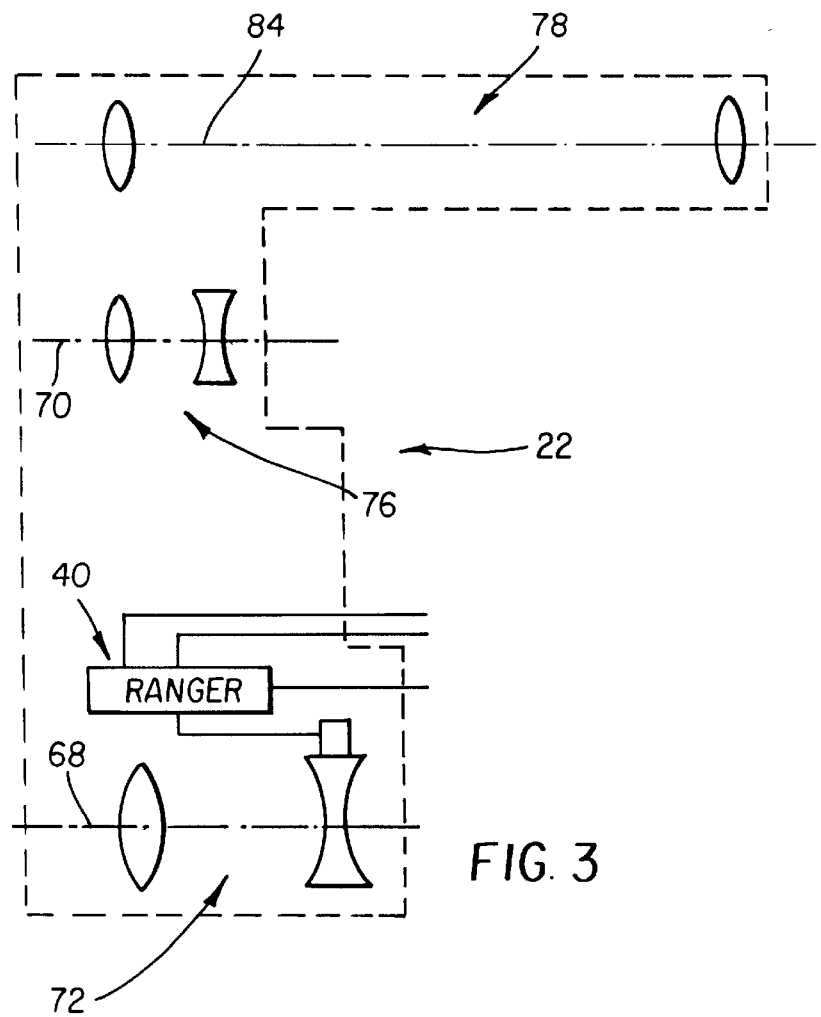
FIG. 3 is a diagrammatical view of the optical system of an alternative embodiment of the camera of FIG. 1.
Figure 4:
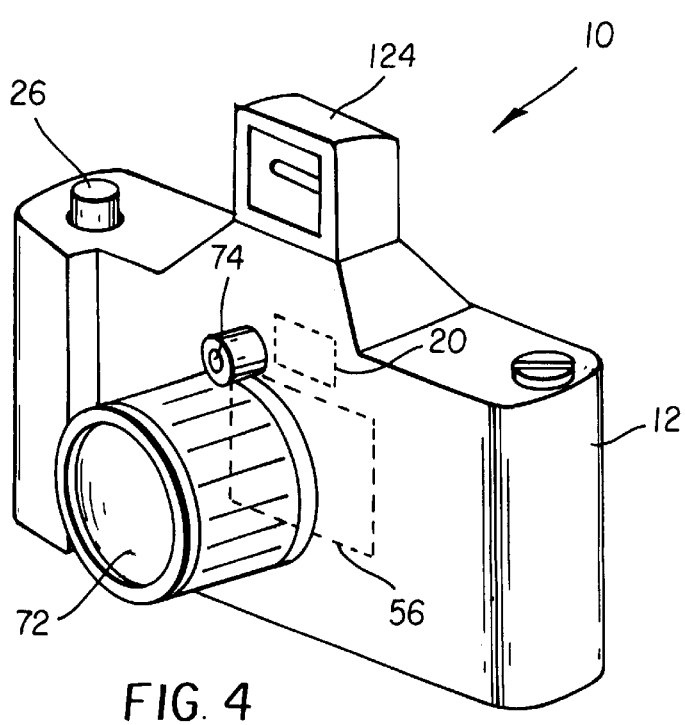
FIG. 4 is a front perspective view of the camera of FIG. 1.

Referring now primarily to FIGS. 1–3, the camera 10 has an optical system 22 that directs light to the exposure frame 56, to the electronic array imager 20, and as shown in FIGS. 2–3, preferably, through a viewfinder to the user. The imager 20 is spaced from the exposure frame 56, thus, the optical system 22 directs light along a first path (indicated in FIG. 1 by line 68) to the exposure frame 56 and along a second path (indicated in FIG. 1 by line 70) to the electronic array imager 20. Both paths converge at a position in front of the camera 10, at the plane of focus within the particular subject image. The details of the optical system 22 are not critical. In FIG. 2, first and second paths, in convergence at the subject image, extend to a taking lens unit 72 and a combined lens unit 74 that includes both an imager lens unit 76 and a viewfinder lens unit 78. The combined lens unit 74 has a partially transmissive mirror 80 that subdivides the second light path between an imager subpath to the imager 20 and a viewfinder subpath that is redirected by a mirror 81 and transmitted through an eyepiece 82 to the photographer. In FIG. 3, the optical system 22 has a taking lens unit 72, an imager lens unit 76, and a viewfinder lens unit 78. The first and second light paths 68,70 and a third light path (indicated in FIG. 3, by line 84) are all separate within the camera. Another arrangement (not illustrated) has a combined lens unit that has first and second light paths coextensive through a shared lens unit to a partially-transmissive mirror where the paths divide and are directed to the imager and exposure frame. Transmission to the viewfinder could be further divided off or separate.

A film shutter 86 shutters the first path. An imager shutter 88 shutters the second path. Diaphragms/aperture plates 87,89 can also be provided in the paths. Each of the shutters 86,88 is switchable between an open state and a closed state. The term "shutter" is used in a broad sense to refer to physical and/or logical elements that provide the function of allowing the passage of light along a light path to a filmstrip or imager for image capture and disallowing that passage at other times. "Shutter" is, thus, inclusive of mechanical and electromechanical shutters of all types. "Shutter" is not inclusive of film transports 58 and like mechanisms that simply move film or an imager 20 in and out of the light path. "Shutter" is inclusive of computer software and hardware features of electronic array imagers that allow an imaging operation to be started and stopped under control of the camera control system.

In currently preferred embodiments, the film shutter 86 is mechanical or electromechanical and the imager shutter 88 is mechanical or electronic. When using a CCD, the shuttering is accomplished by shifting the accumulated charge under a light shield that provides a non photo-active region). This may be a full frame as in a frame transfer device CCD or a horizontal line as in an interline transfer device CCD. When using a CID, the charge on each pixel is injected into substrate at the beginning of the exposure. At the end of the exposure, the charge in each pixel is read. The difficulty encountered here is that the first pixel read has less exposure time than the last pixel read. The amount of difference is the time required to read the entire array. This may or not be significant depending upon the total exposure time and the maximum time needed to read the entire array. CMOS imagers are commonly shuttered by a method called a rolling shutter. This method shutters each individual line to a common shutter time, but the exposure time for each line begins sequentially. This means that even with a short exposure time, moving objects will be distorted. Given horizontal motion, vertical features will image diagonally due to the temporal difference in the line by line exposure. A better method for shuttering CMOS imagers is described in U.S. Pat. No. 5,986,297, which is hereby incorporated herein by reference. In this method called Single Frame Capture Mode, all pixels are allowed to integrate charge during exposure time. At the end of the exposure time, all pixels are simultaneously transferred to the floating diffusion of the device. At this point, sequential readout by lines is possible.

Signal lines 90 electronically connect the imager 20 through a processor 92 and other electronic components to the image display 40. The imager 20 receives a light image (the subject image) and converts the light image to an analog electrical signal, the initial electronic image. (The electronic image is generally discussed herein in the singular. Considerations applicable to capture of single electronic images are similarly applicable to the capture of first and second electronic images for visualization of relative motion, as discussed below, in detail.) The electronic imager 20 is driven by the imager driver 94. The initial electronic image is converted by an analog to digital (A/D) converter 96 to a digital electronic image, which is then processed and stored in memory 98. "Memory" refers to a suitably sized logical unit of physical memory provided in semiconductor memory or magnetic memory, or the like. The electronic images are modified by the processor 92, as necessary for the requirements of a particular display 40, and output to the display 40 as a resulting electronic image. The display 40 is driven by a display driver 104 and produces a display image that is viewed by the user.

A controller is connected to the other components by a data bus 101. The controller 100 facilitates the transfers of the image between the electronic components and provides other control functions, as necessary. The controller 100 includes a timing generation circuit 102 (identified in FIG. 2 as "clocks") produces control signals for all electronic components in timing relationship. The controller 100 is illustrated as a single component, but it will be understood that this is a matter of convenience in illustration. The controller 100 can be provided as multiple components of equivalent function in distributed locations. The same considerations apply to the processor 92 and other components. Likewise, components illustrated as separate units herein may be conveniently combined or shared in some embodiments.

The type of image display 40 used is not critical. For example, the display can be a liquid crystal display, a cathode ray tube display, or an organic electroluminescent display, "OELD" (also referred to as an organic light emitting display, "OLED"). Displays having low power requirements are preferred. It is also preferred that the image display 40 is operated on demand by actuation of a switch 99 and that the image display 40 is turned off by a timer or by initial depression of the shutter release.

The display 40 is preferably mounted on the back or top of the body 12, so as to be readily viewable by the photographer immediately following a picture taking. Additional information displays 40 can be provided on the body 12 to present camera information to the photographer, such as exposures remaining, battery state, printing format (such as C, H, or P), flash state, and the like. This information can also be provided on the image display 40 as a superimposition on the image or alternately instead of the image.

Figure 5:
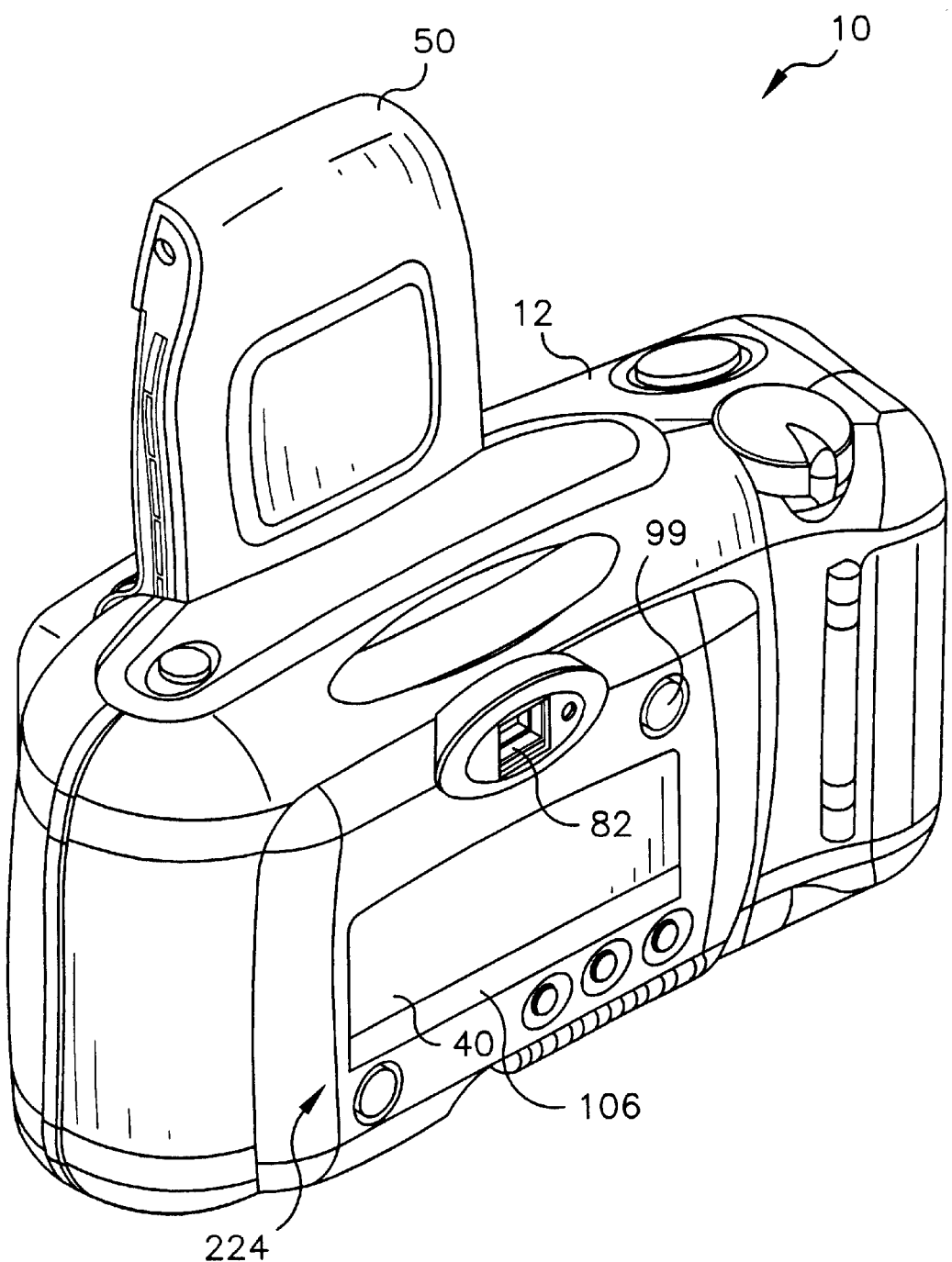
FIG. 5 is a rear perspective view of another version of the camera of FIG. 1, having a modified body shape.
Figure 6:
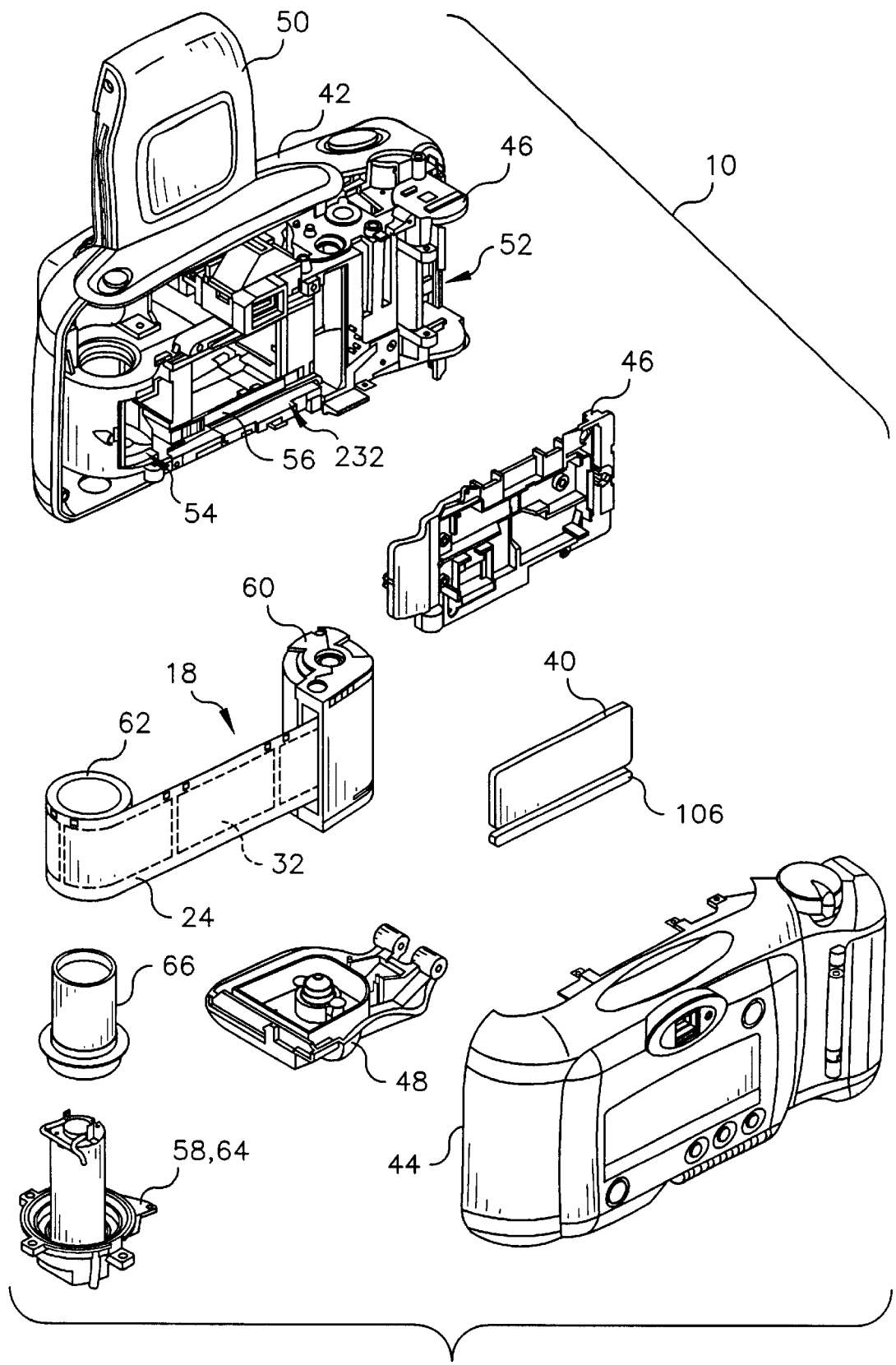
FIG. 6 is a partially exploded view of the camera of FIG. 3.

The image display 40 is shown in FIGS. 5–6 mounted to the back of the body 12. An information display 106 is mounted to the body 12 adjacent the image display 40 so that the two (or more displays 40) form a single user interface that can be viewed by the photographer in a single glance. As with information displays 106, the image display 40 can be mounted instead or additional so as to be viewable through the viewfinder as a virtual display 40. The image display 40 can also be used instead of or in addition to an optical viewfinder.

It is preferred that the imager 20 captures and the image display 40 shows substantially the same geometric extent of the subject image 28 as the latent image 30, since the photographer can verify only what is shown in the display 40. For this reason it is preferred that the display 40 show from 85–100 percent of the latent image 30, or more preferably from 95–100 percent of the latent image 30.

The shutter release or shutter button 26 is connected to both shutters 86,88. To take a picture, the shutter release 26 is actuated by the user and trips from a set state to an intermediate state, and then to a released state. The shutter release is typically actuated by pushing, and, for convenience the shutter release is generally described herein as moving through a "first stroke" from the set state to the intermediate state and through a "second stroke" from the intermediate state to the released state.

A first switch 108 actuates when the shutter release 26 is pushed to the first stroke. When the first switch 108 actuates, exposure-delimiting camera components are operated. A wide variety of suitable components that can provide these functions are well known to those of skill in the art. For example, as shown in FIG. 2, when the photographer pushes the shutter release 26 as a preparation for taking a photograph, the first stroke turns on the first switch 108, and in response, an exposure meter 110 has an exposure sensor 112 that measures a brightness value (Bv) and a control unit 114 that outputs control parameters based on the brightness value. The controller 100 uses these parameters to calculate exposure parameters for the film exposure and, directly or indirectly, the shutter time or times for the electronic exposure of the imager 20. In addition to setting parameters for the shutters 86,88, the controller 100 can also change the aperture for one or both of the film paths utilizing respective shutter and aperture drivers 116,118 and 120,122, all respectively. A flash unit 124 can likewise be energized and actuated as needed. Suitable components and programming for these purposes are well known to those of skill in the art. Parameters considered include relative differences in the speed of the film and the speed of the imager, differences in optical paths, and the like.

The use of a two "stroke" shutter release is well known in the art and the first switch 108 in the camera 10 can actuate functions provided in other cameras in a similar manner. For example, the optical system 22 or taking lens unit 72 can autofocus to a detected focused distance. A particular autofocusing related display function is discussed below in greater detail.

A second switch 126 actuates when the shutter release 26 is further pushed to a second stroke. When the second switch 126 actuates, the film shutter 86 is tripped and the capture of the latent image exposure on the film frame begins. The film shutter 86 momentarily opens for a duration referred to herein as a "latent image exposure time interval". The imager shutter 88 is also actuated and momentarily opens once, or in particular embodiments described below, twice. The opening and closing of the shutters 86,88 is a function of the shutters themselves and shutter drivers 116,118 as mediated by the controller 100. The shutter drivers 116,118 and controller 100 are also referred to collectively herein, for this purpose as the "actuator" 150, as shown in FIG. 1.

The latent image 30 is taken by opening the film shutter 86 for the latent image exposure time interval. The duration of the latent image exposure time interval is determined and set, as above discussed, before the film exposure, in the same manner as in other photographic film cameras. The light value for a particular scene is determined and the latent image exposure time is then calculated. This is illustrated as an automatic procedure, but could be done manually using an external meter and filly manual controls. Corresponding to the latent image exposure time interval is a nominal electronic exposure time interval for the electronic image capture. The nominal electronic exposure time interval is calculated in the same manner as the latent image exposure time interval. The nominal electronic exposure time interval can be used as the actual electronic exposure time interval or may be used in further calculations as discussed below.

Figure 12:
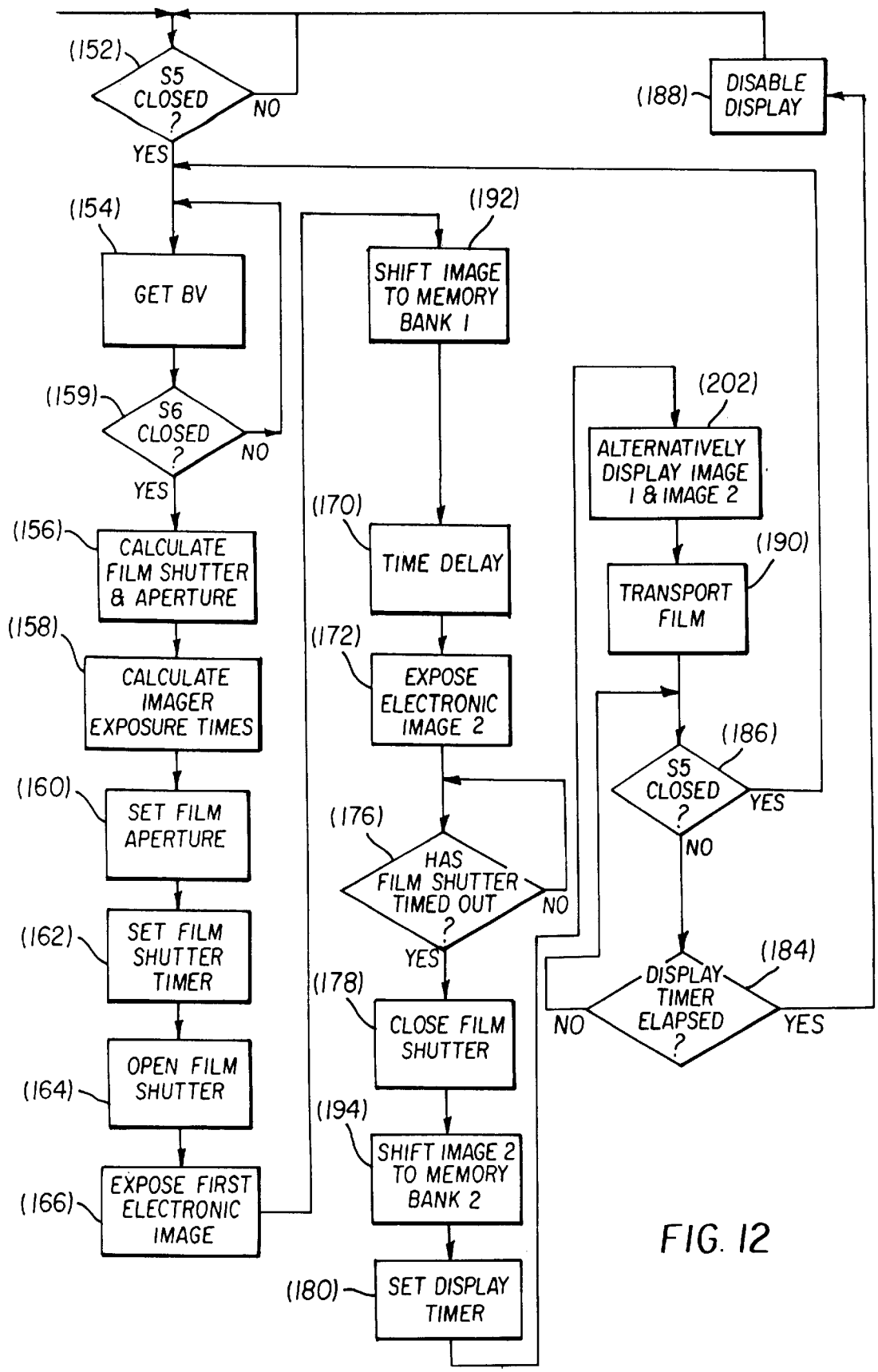
FIG. 12 is a flow chart illustrating detailed features of another modification of the operation of the camera of FIG. 1.
Figure 13:
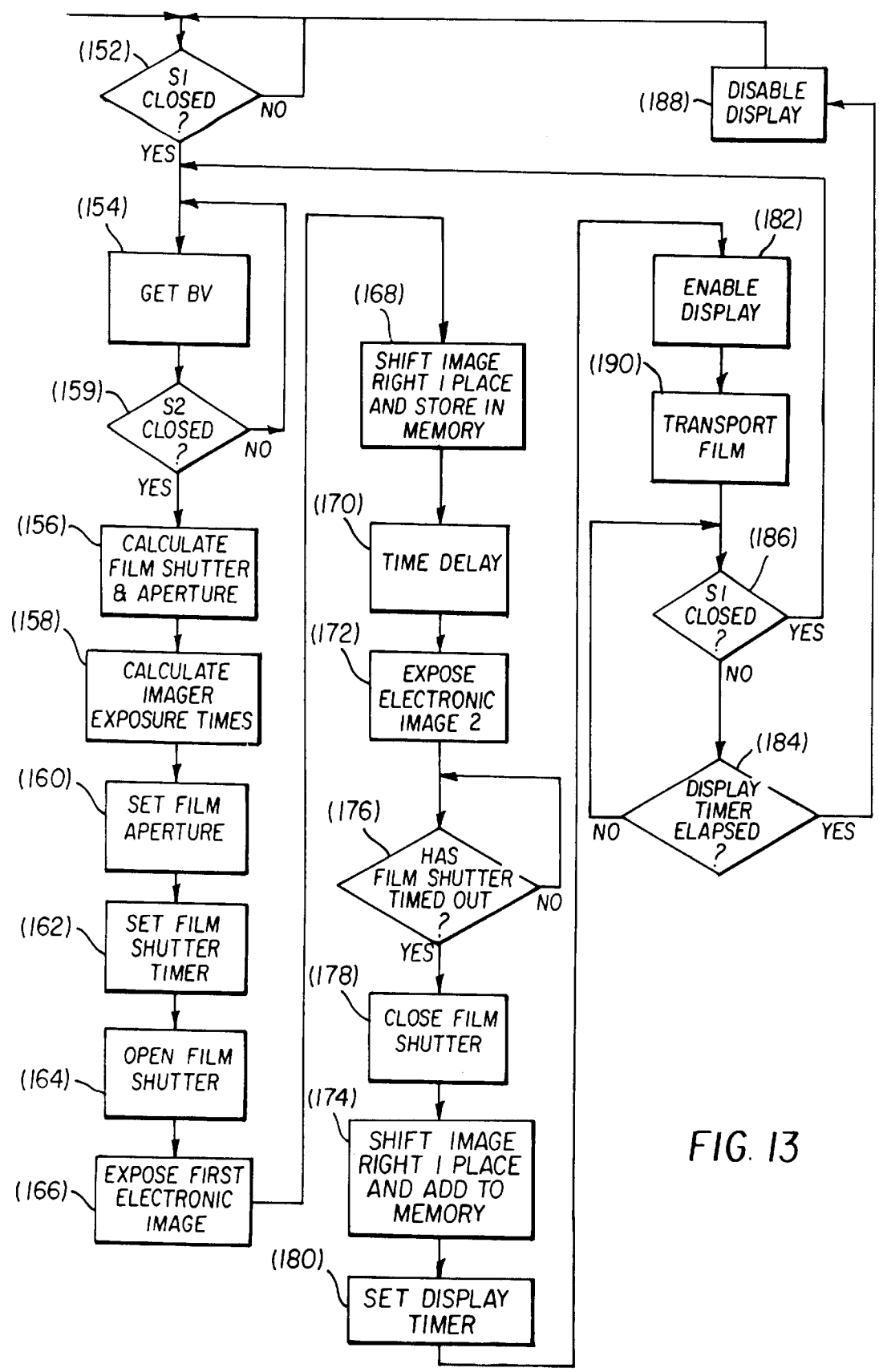
FIG. 13 is a flow chart illustrating detailed features of yet another modification of the operation of the camera of FIG. 1.
Figure 14:
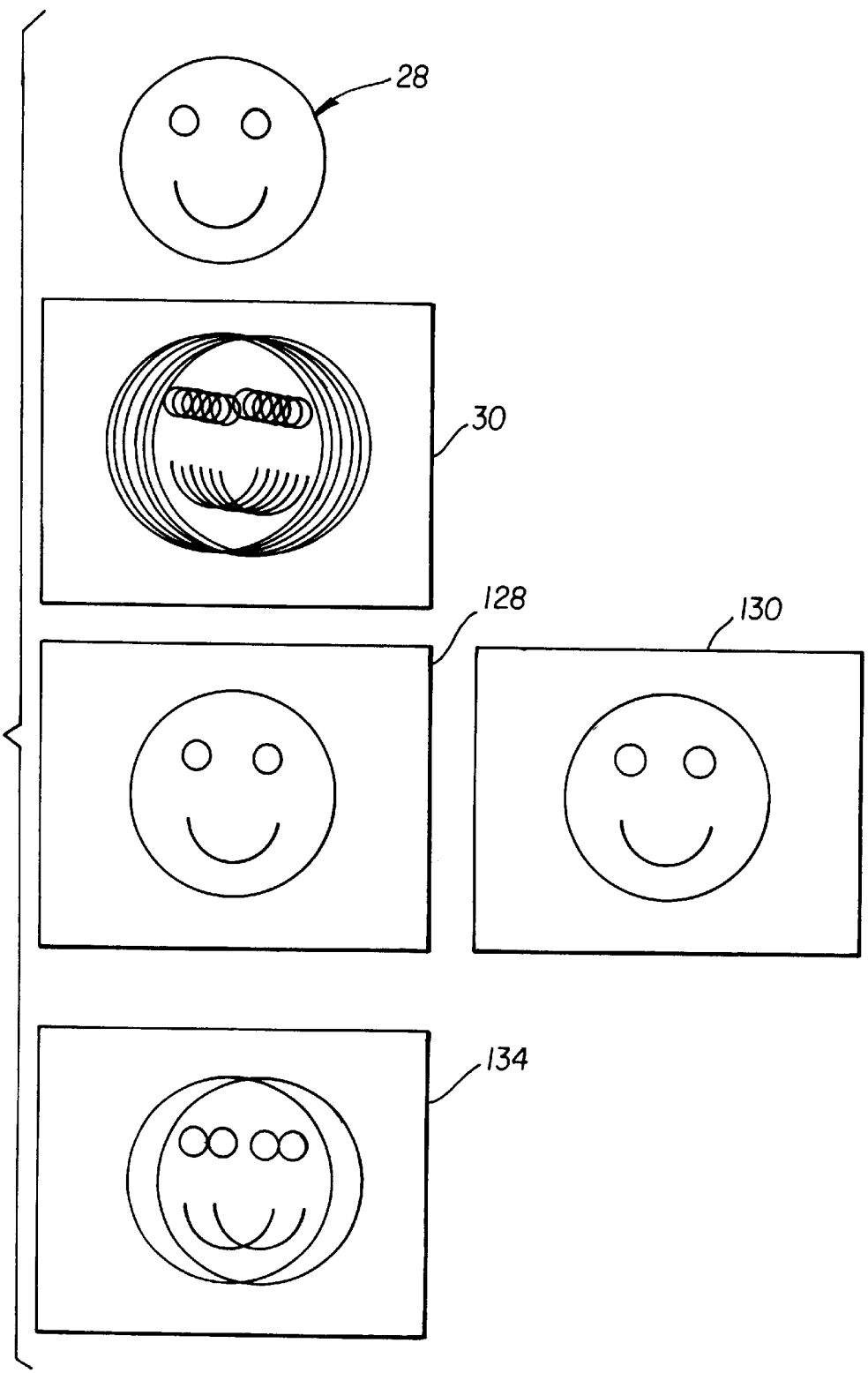
FIG. 14 is a diagram of the images utilized in the methods of FIGS. 11–13.

Referring now particularly to FIGS. 7–14, relative motion in the subject image 28 that occurs during the latent image exposure time interval is captured in the latent image 30 as a blurred image. (FIG. 14 illustrates the blur in the latent image 30 as a series of closely juxtaposed lines.) Subject motion, rather than camera motion, likewise appears as a blurred area within the latent image 30. The extent of blur is a function of range of the particular motion and the time duration of the motion relative to the latent image time interval. This blur is not seen in a corresponding electronic image unless the electronic exposure time interval is similar in duration to the latent image exposure time interval. This can be the case under some conditions, but generally is not. The electronic exposure time interval is generally much shorter than the latent image exposure time interval. As a result in many cases, a single electronic exposure for the electronic exposure time interval would stop motion, while the corresponding film exposure would not. This is not helpful for verification. A solution provided herein is the use of two temporally displaced electronic exposures.

Referring now particularly to FIGS. 2 and 14, the camera 10 captures three images for each "picture taking" event. The subject image 28 is captured as one latent image 30 on film and two initial electronic images 128, 130. One electronic image 130 follows the other 128 in succession, following a delay. After capture, the first and second initial electronic images 128,130 are sent as analog output to an A/D converter 96 for conversion to first and second digital electronic images (not separately illustrated), respectively. The first digital electronic image is transferred from the A/D converter 96 and stored in a first memory 98a. The second digital electronic image is transferred form the A/D converter 96 and stored in a second memory 98b. The electronic images are next transferred from the memories 98a,98b to a combiner 132. (The combiner 132 is illustrated as part of the processor 92. The processor 92 is also shown as being downstream from the memories 98. Both of these features are shown in this manner as a matter of convenience for illustration purposes. Connections and usage of the processor and memory need not follow this simplification. Other connections and usage are indicated in FIG. 2 by an arrow 138.) The electronic images then combined to provide a resultant electronic image 134. The combiner 132 combines the electronic images, modifies the resultant electronic image as necessary for the requirements of a particular display 40, and outputs the resultant image 134 to the display 40, where the displayed result image (display image) produced is seen by the photographer.

It is preferred that the display 40 only remain on for a limited time period when a verifying display 40 image is viewed. In the embodiment shown in FIG. 2, a timer is set by the timing generation circuit 102 and the display 40 driver enables the display 40. This allows the combined image to be displayed for the user for a predetermined time which is controlled by the timer. If first switch 108 is closed again due to the user beginning to take another photograph, the sequence is started again. If not, the timer runs out and the display 40 is disabled by the display 40 driver.

Figure 10:
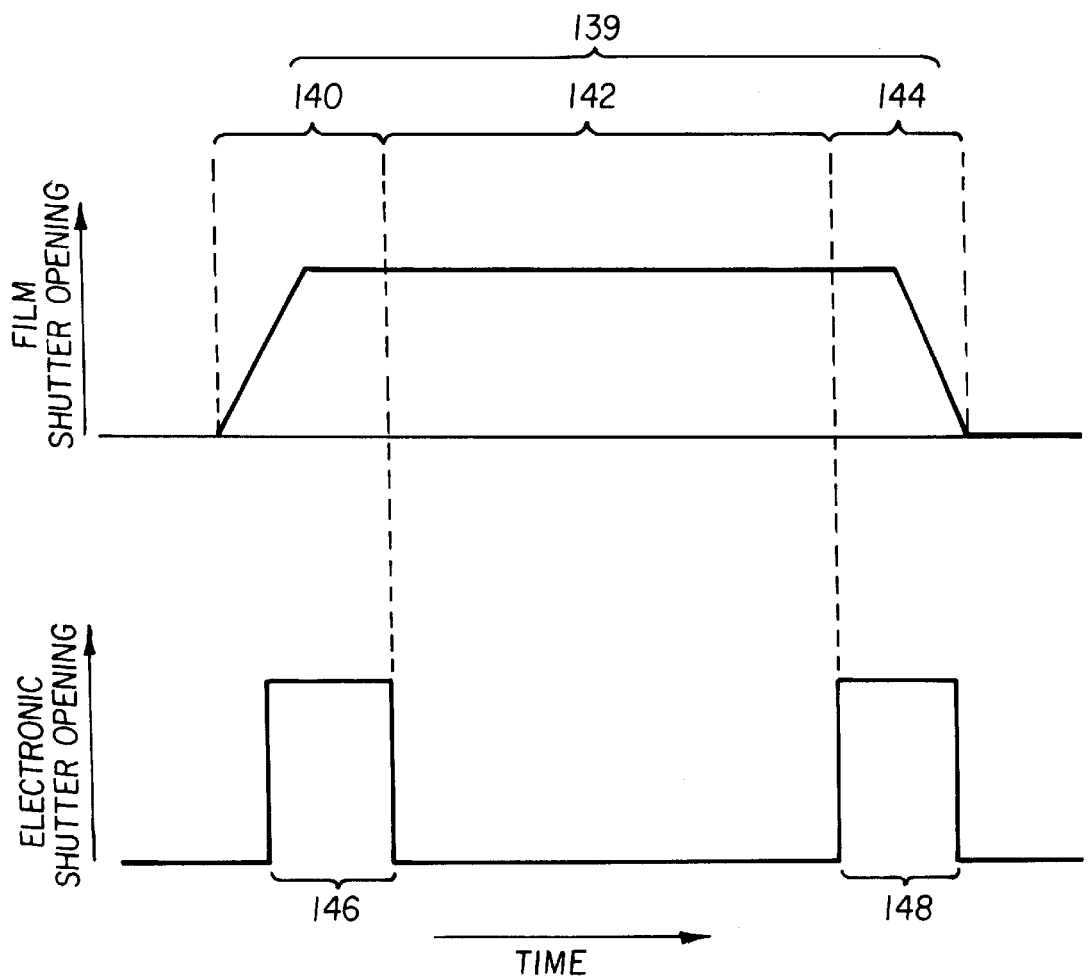
FIG. 10 is a diagram of the temporal relationship between the opening of the film shutter and electronic shutter in the method of FIG. 7.

As illustrated in FIG. 10, the latent image exposure time interval 139 has an initial portion 140, a middle portion 142, and a final portion 144. (Divisions between the portions 140,142,144 are indicated by dashed lines.) The initial, middle, and final portions 140,142,144 of the latent image exposure time interval are defined by first and second electronic exposure time intervals 146,148. The initial portion 140 is simultaneous with at least part of the first electronic exposure time interval 146. The final portion 144 is simultaneous with at least part of the second electronic exposure time interval 148. In other words, the actuator 150 momentarily opens the imager shutter 88 a first time during the initial portion 140 of the film exposure time interval 139 and momentarily opens the imager shutter 88 a second time during the final portion 144 of the film exposure time interval 139. The middle portion 142 is not simultaneous with any part of either of the two electronic exposure time intervals 146,148.

Motions that cause a difference in the subject image 28 between the initial and final portions 140,144 of the latent image exposure time interval 139 will cause corresponding differences in the two electronic images 128,130. The camera 10 makes visible to the user a presentation of both of the electronic images. (It will be understood that references to the "a presentation of the electronic images" and the like, are indications that although processing and other procedures occur before the photographer sees the verifying image, the major image content of the initial electronic images, and the original scene at two different times, is preserved and made available to the photographer. The quantitative extent of image content preserved is a function of the components used and can be varied to meet particular requirements.)

The resultant image 134 makes the relative camera-subject motion apparent to the user immediately after capture of the latent image 30. This allows the user to take another picture of the same subject matter, while correcting for the undesired motion that was present in the earlier capture event.

Since the two electronic images 128,130 are discontinuous in time, the resultant image 134 does not visualize motion as strictly a blur; but rather as two different likenesses of the same subject, as shown in FIG. 14. Each "likeness" has better defined edges than those present in the corresponding latent image 30; which, after processing would instead show a blur. The resultant image 134 is thus artificially sharpened in movement areas relative to the corresponding latent image 30 and is not an exact match. The human eye can more easily detect the motion representation provided by the resultant image 134 than would be the case if the resultant image exacted matched the latent image 30.

Relative motion between the camera 10 and subject matter that is completely limited to the middle portion 142 of the latent image exposure time interval 139 is not detected. For most picture taking, this is unimportant; since the majority of motions seen in actual picture taking and those motions most damaging to final image quality would be detected.

It is preferred that the first electronic exposure time interval 146 begin at substantially the same time as the latent image exposure time interval 139 and that the second electronic exposure time interval 148 end at substantially the same time as the latent image exposure time interval 139. The alternative, that one or both electronic exposure time intervals 146,148 go beyond the time limits of the latent image exposure time interval 139; presents a risk that the resultant image 134 will show motion that was not timely and was not captured by the latent image 30. The time intervals 139,146 and 139,148 are "substantially" simultaneous if any difference in simultaneity is of a length of time that would stop motion in an image capture event. For example, a first electronic exposure image interval that started 1/250 second before the latent image 30 exposure time interval would be substantially simultaneous with the latent image 30 exposure time interval.

The duration of the electronic exposure time intervals is a function of both the nominal electronic exposure time interval and the method used to obtain the resultant image. It is preferred that each electronic image 128,130 be optimized is if that image was to be utilized by itself. The electronic images are then manipulated as required to make the combined image.

The relative proportions of the initial, middle, and final portions of the latent image exposure time interval can vary, but it is preferred that the initial and final portions be equal in duration and have the same temporal overlap with the respective electronic exposure time intervals. The middle portion can be shorter in duration than either of the other two portions, but there is little advantage in that case over a electronic exposure time interval that matches or substantially matches the duration of the latent image exposure time interval. The camera 10 is advantageous when the total duration of electronic exposure is short relative to the film exposure and, thus, the middle portion is longer than either of the initial and final portions. The camera 10 is even more advantageous when the middle portion is longer than the total of the initial and final portions.

Figure 7:
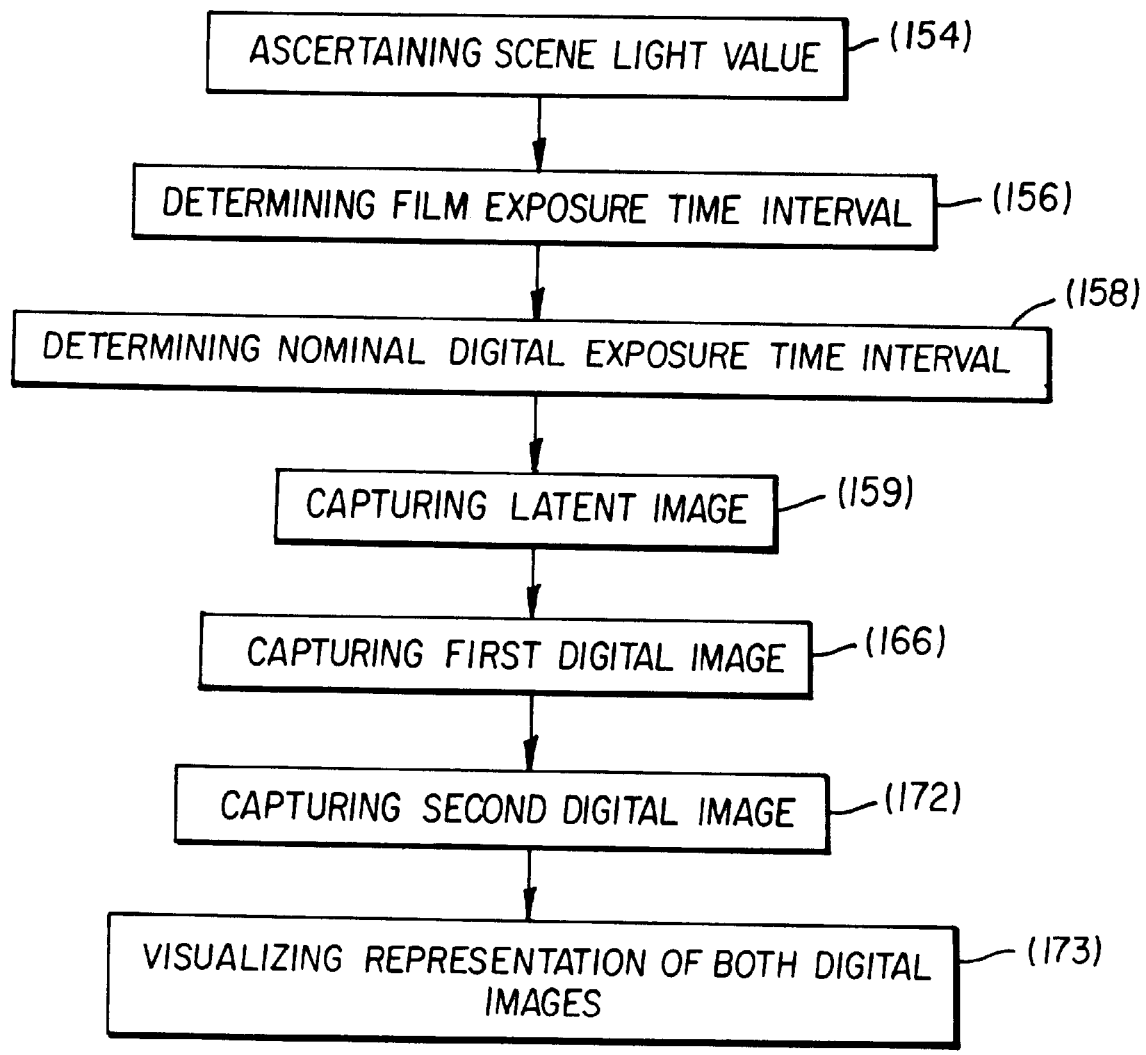
FIG. 7 is a flow chart of an embodiment of the motion verifying photography method.
Figure 8:
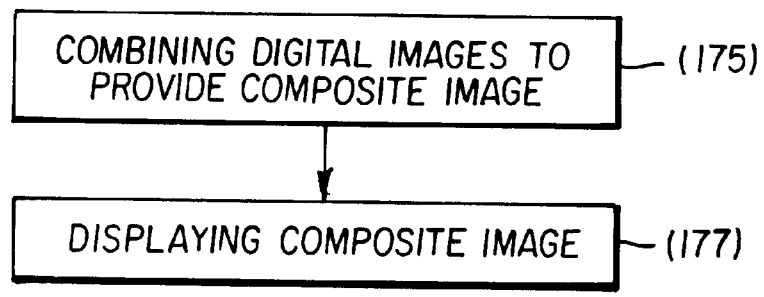
FIG. 8 is a detailed flow chart of the visualizing step of the method of FIG. 7.
Figure 9:
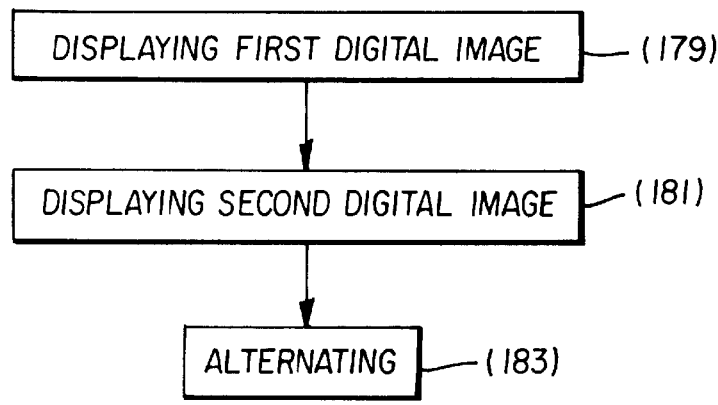
FIG. 9 is a detailed flow chart of a modification of the visualizing step of the method of FIG. 7.

FIGS. 7–9 provide an outline of the method of operation of the motion verifying camera. The scene light value is ascertained (154). The latent image exposure time interval is determined (156). A nominal digital exposure time interval is determined (158). The latent image is captured (159). The electronic images are captured (166),(172). The electronic images are then visualized by means of the resultant image (173). The resultant image can be provided by combining the digital images (175). The resultant combined image is then displayed (177). The resultant image can also be provided by displaying (179),(181) the first and second images, in alternation (183).

FIG. 13 illustrates the method of operation of an embodiment in which an imager 20 has a nominal electronic exposure time interval for a particular subject image of "t". The electronic images each have the same duration as the nominal exposure time interval. The electronic images are added together to provide the resultant image. In this method, the controller 100 initially does a determination (152) of whether the first switch "S1" is closed. If so, then the light value is ascertained (154) and the film shutter and aperture are calculated (156) and the two electronic exposure time intervals are calculated (158). (In this embodiment, the aperture for the imager is does not change.) During this time, a determination (159) is made that the second switch "S2" is closed. The film aperture is set (160) and the film shutter timer is set (162). The film shutter is opened (164) and the electronic shutter is opened and closed to expose (166) the first electronic image. The first image is then shifted right one place (effectively dividing the values of image information by two) and stored in memory (168). A time delay is waited through (170) and the second electronic image is exposed (172). The second image is shifted right one place and added to the first image on a pixel-by-pixel basis (174). The film shutter timer is checked (176) and the film shutter is closed (178) at the end of the latent image exposure time interval. This sets (180) a display timer. The display timer and display are enabled (182) by the user or otherwise as desired. The display is shown until the display time elapses (184) or the first switch is closed (186), at which time, the display is disabled (188). During this time period, the film is transported (190) to advance to the next film frame.

In a variation of the previously described embodiment, the two electronic exposures each have a duration that is one-half the nominal electronic exposure time interval. The exposure values are added together without right shifting or the like. This approach is not preferred, because the signal to noise ratio of each of the images taken at "t/2" is greater than the signal to noise ratio of a corresponding image taken at a duration of "t".

Figure 11:
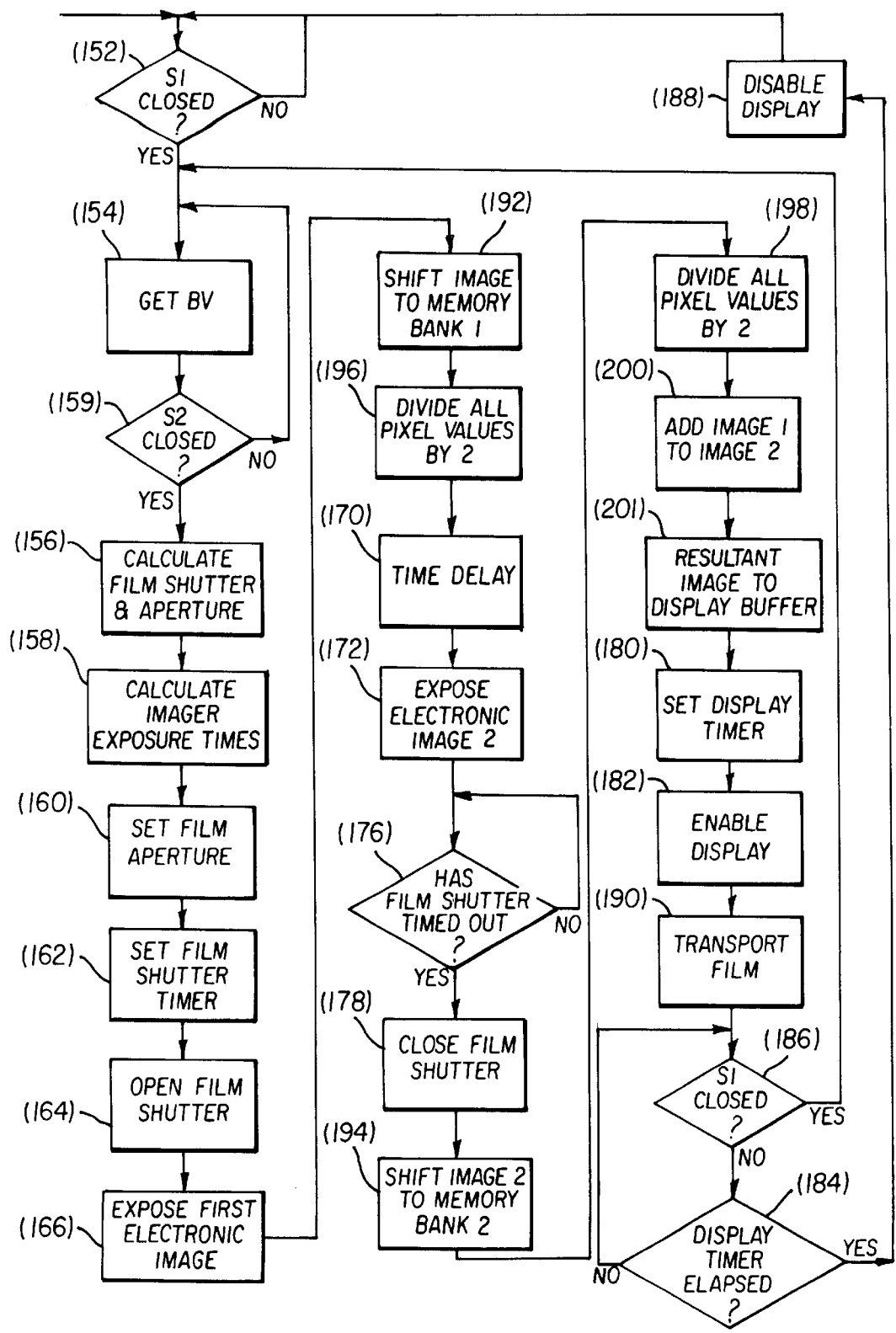
FIG. 11 is a flow chart illustrating detailed features of one modification of the operation of the camera of FIG. 1.

FIG. 11 illustrates a preferred embodiment of the method in which each electronic image exposure time interval 146,148 is equal to a nominal electronic exposure time interval of "t". The electronic images are shifted (192),(194) to respective memory banks and the set of pixel values of each image are divided (196),(198) by two to produce halved sets of pixel values. The halved images, that is, the two sets of halved pixel values are added (200) together by matrix addition and the resultant image is then sent (201) to a display buffer, that is, memory. The resultant image is displayed from memory and the other steps of the method are like those earlier described in relation to the method of FIG. 13.

The matrix division and addition are based on the fact that each digital electronic image has a set of pixel values. The mathematical operations are performed on the individual pixels from each image that represent the same location. For example, when the digital electronic images are each mathematically halved and are then added together, the pixel values of the first digital electronic image are divided by two to provide a first set of halved pixel values; the pixel values of the second digital electronic image are divided by two to provide a second set of halved pixel values; and the respective pixel values (values for each location) of the first and second sets of halved pixel values of said first and second digital electronic images to provide said set of pixel values of said composite image.

In an alternative embodiment of the method shown in FIG. 12, the resultant image is a showing of the first and second electronic images alternating in rapid repeating sequence. The first and second electronic images are each exposed for the nominal electronic exposure time interval. The two images are shifted (192,194) to memory banks and are then alternatively displayed (202). Other steps are as described for the method of FIG. 11. To make the differences in the two electronic images apparent to the user, each of two electronic images is displayed for a short time period, preferably less than about 1 second, before it is replaced by the other electronic image. In a particular embodiment, the alternating is at a rate near or above the flicker perception rate. A display rate of 60 frames per second, with each electronic image displayed 30 times per second is appropriate.

With a verifying camera 10, the verifying image does not have to have the same quality as the latent image 30 captured on film. As a result the imager 20 and portion of the optical system 22 directing light to the imager 20 can be made smaller simpler and lighter. For example, the taking lens unit 72 can be focusable and the imager lens unit 76 can have a fixed focus. Alternatively, both the taking lens unit 72 and the imager lens unit 76 can be focusable, but the two lens units can focus over different ranges. These differences between the taking and imager lens units present a problem in terms of verifying focus, since the depth of field properties for the image captured by the imager 20 and corresponding latent image 30 do not match.

Figure 15:
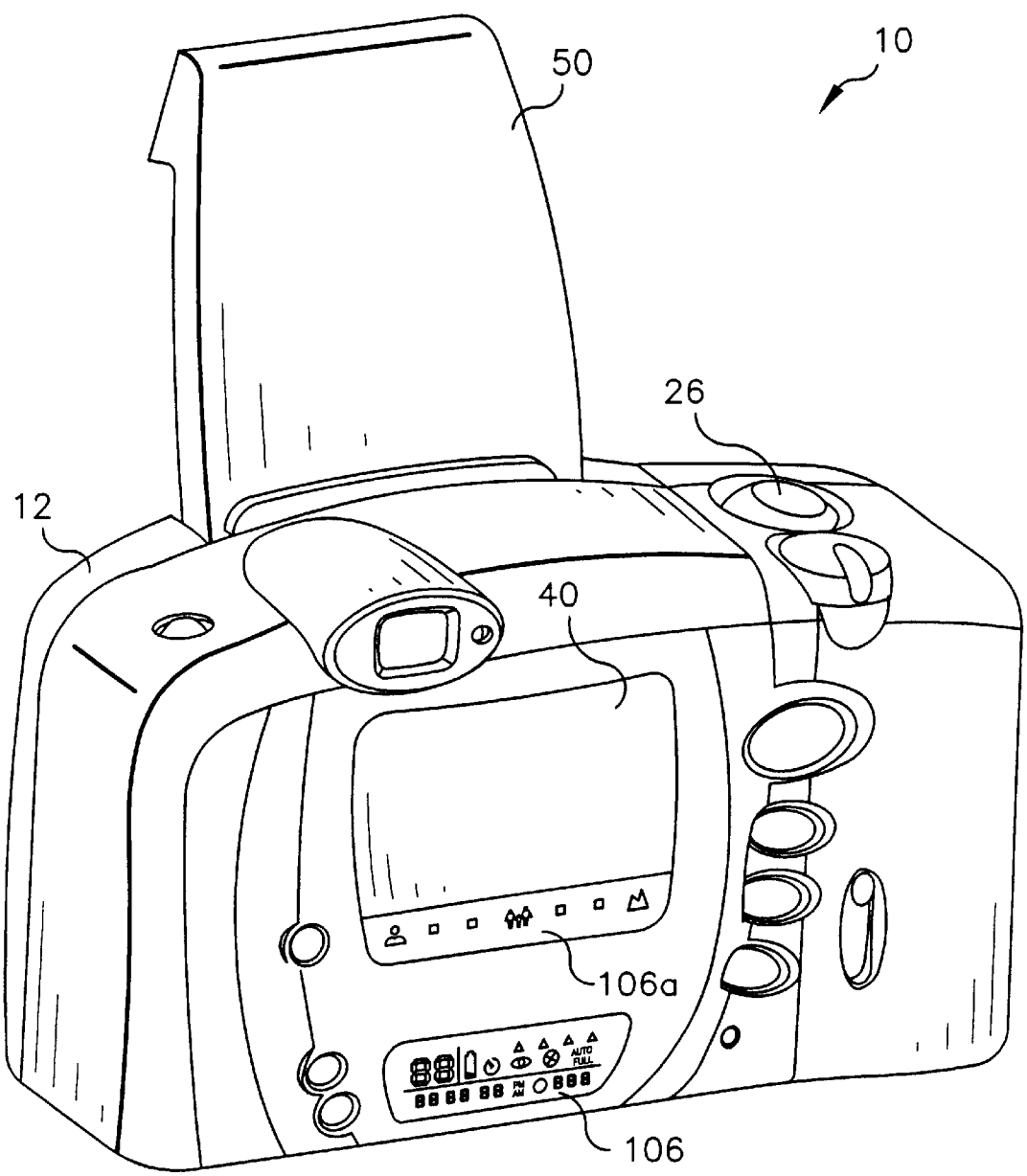
FIG. 15 is a diagrammatical view illustrating some of the features of the camera of FIG. 1.
Figure 16:
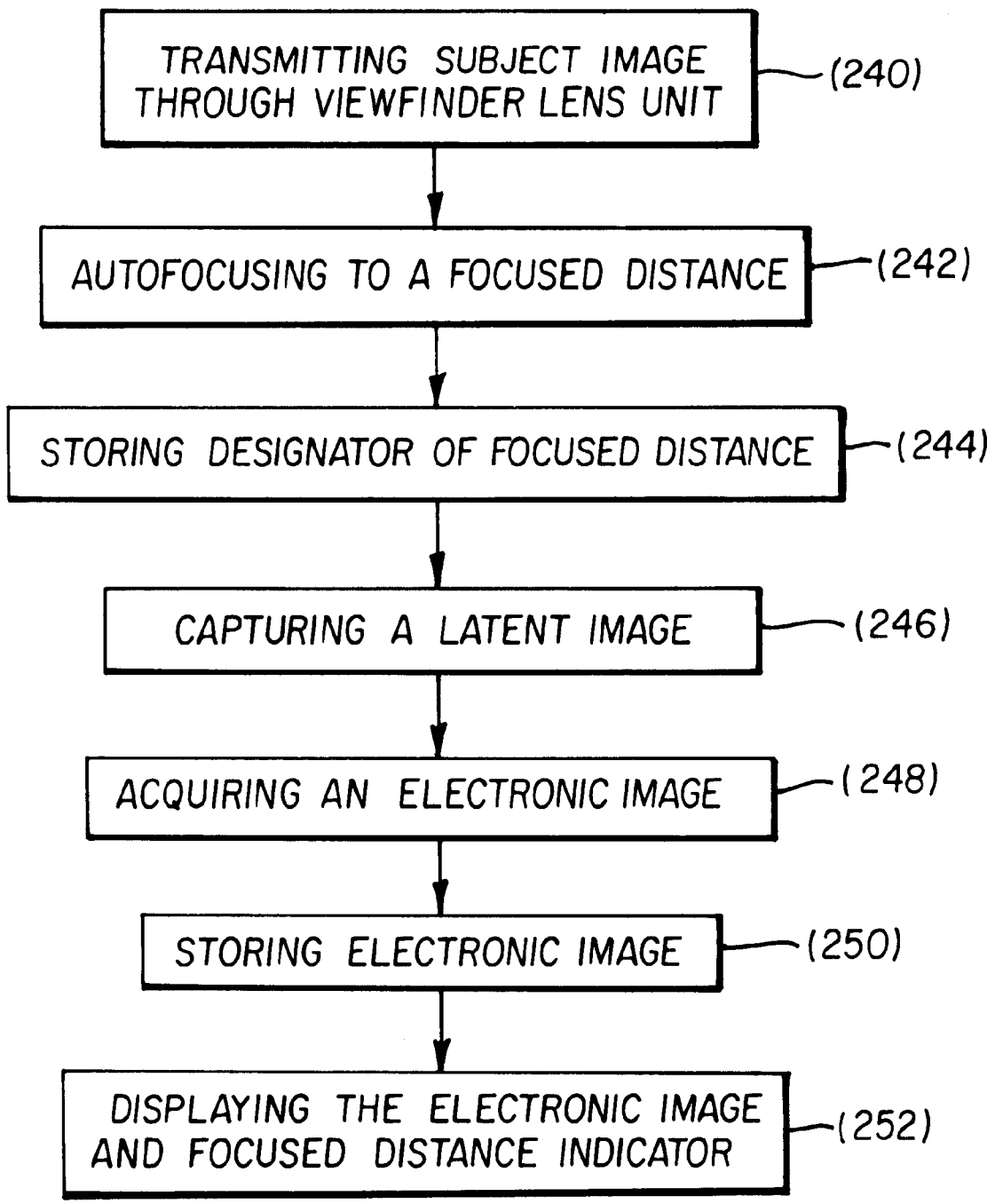
FIG. 16 is a flow chart of an embodiment of the focus verifying photography method.
Figure 17:
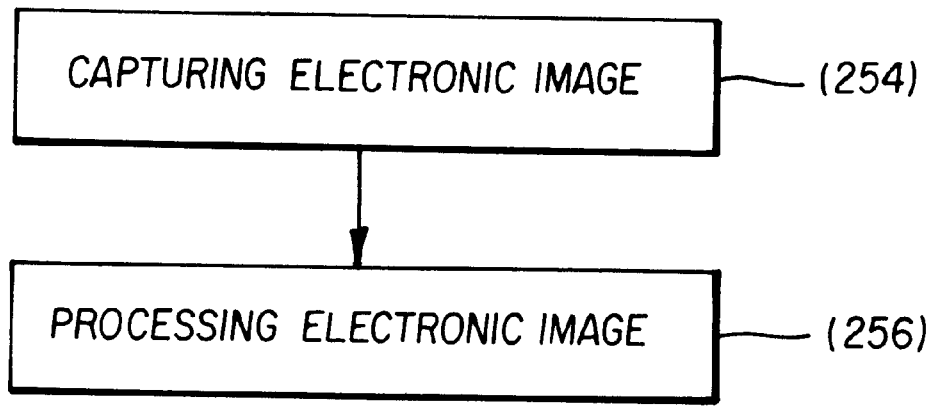
FIG. 17 is a detailed flow chart of the acquiring step of the method of FIG. 16.
Figure 18:
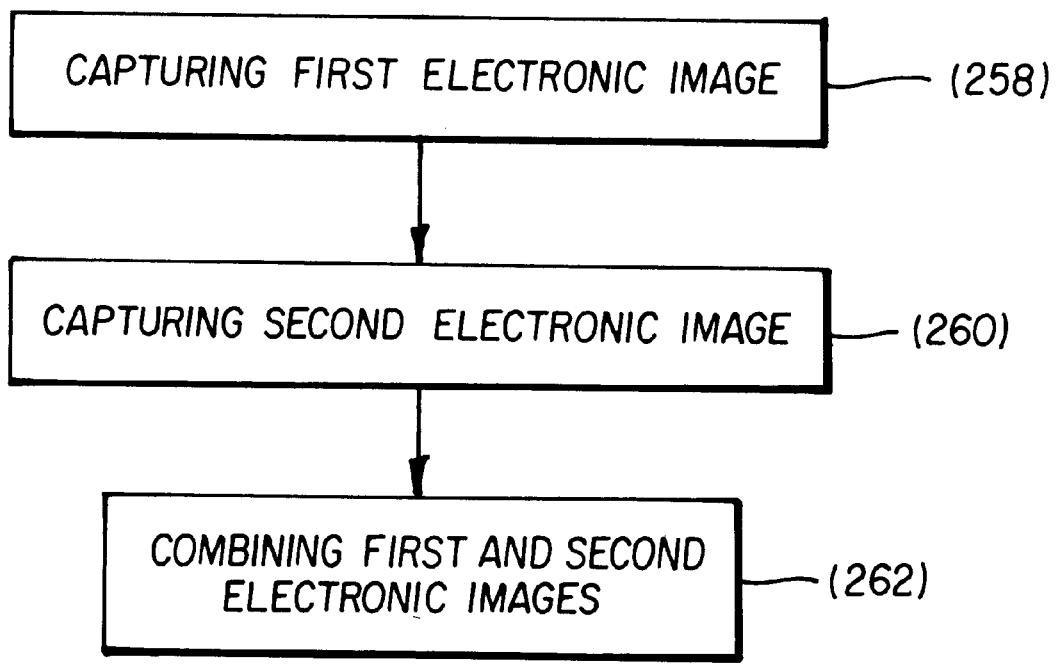
FIG. 18 is a detailed flow chart of a modification of the acquiring step of the method of FIG. 16.

FIGS. 2 and 15 illustrate a camera 10 which provides for verification of the focused distance at which an image was captured along with a verification of motion in the image captured on film. The camera 10 transmits (240) the subject image through a viewfinder lens unit, autofocuses (242) to a focused distance and stores (244) a designator of the focused distance. The camera then captures (246) a latent image and acquires (248) and stores (250) an electronic image. The electronic image and an indicator of the focused distance are then displayed (252). The acquiring (248) can include capturing (254) an electronic image and processing (256) that image; or, alternatively, capturing (258),(260) first and second electronic images and combining (262) the first and second electronic images. Preferred features of the camera 10 are as above-described with additional features or varied features as described below. As an alternative, the camera can lack motion verification, that is, can be limited to capture a single electronic images per latent image, but this is not preferred.

The optical system 22 of the camera 10 includes an autofocusing lens system 204 that has a taking lens unit 72 that is capable of focusing at a plurality of focusing distances. The term "focusing distance" used herein refers to a state or "position" of the lens unit 72, in which the lens is focused to a specific subject distance from the lens unit 72. This is generally accomplished by moving one or more lens elements 206 relative to one or more other fixed elements 208. The focusing can be continuous or stepwise. Each focusing distance has an associated hyperfocal distance. With stepwise focusing, the hyperfocal distances provided by successive focusing distance steps may or may not overlap.

The first path of the optical system 22, the path to the film frame 32, extends through the taking lens unit 72. The depth of field provided at a particular focusing distance varies. The second path to the imager 20 has optical elements that do not provide the same depth of field for the different focusing distances as are provided by the optical elements of the taking lens. In the camera 10 of FIG. 15, the second path has a fixed focus and constant depth of field. The taking lens unit is stepwise focused and the depth of field varies with the focused distance.

In addition to the lens unit 74, the autofocus lens system 204 includes a ranger 210. The ranger 210 has a rangefinder 212 that determines the focused distance for a subject image and a focus drive 214 that moves the movable lens element or elements 206 to provide the determined focused distance.

When the first switch 108 is actuated by the shutter button 26, the rangefinder 212 determines the subject distance. This can be done a variety of ways. FIG. 2 illustrates a passive autoranging rangefinder. The rangefinder 212 has a pair of lenses 216 backed by a linear array imager 218. Each lens 216 images the subject image onto a segment of the linear array 218. The signals from each array are compared. The subject distance is indicated by how many pixels one of the signals must be indexed relative to the other signal to provide a match. The linear array 218 can similarly be divided into sections to provide multiple spot focusing. The camera can select the subject distance from one of the spots based on a particular rule. For example, the subject distance can be considered to be the closest spot. When the subject distance has been determined, the lens system 204 is focused to an appropriate focused distance corresponding to the particular subject distance.

The autofocusing lens system 204 includes a sender 220 that transmits a signal of the focusing distance to a focusing distance memory 98c for storage. As above-discussed, autofocusing occurs when the first switch 108 is actuated. The signal of focusing distance is sent to memory 98c at that time. The details of the sender 220 are not critical. For example, in the embodiment shown in FIG. 2, the sender 220 is part of the ranger 210. The electrical signal that causes the taking lens unit 72 to focus also signals the controller 100 to responsively record a corresponding designator of the focused distance in the information memory 98c. The designator (not shown) can be a numerical value or, for a stepped autofocus, can be an encodement identifying a particular focused distance step for the taking lens unit 72. The sender 220 can alternatively utilize a sensor (not illustrated), such as an optical sensor to detect the focusing distance from the taking lens unit 72 and then signal the controller 100.

The camera 10 has an focusing information display 106a that provides an indication of the focused distance of the displayed image. The information display 106a is driven by an information display driver 223. The focusing information display 106a is provided along with the image display in an image panel 224 that can be perused in a single glance without reorienting the camera. This allows a user to easily check for misfocusing along with other verification of the image. The camera 10 can have a second information display 106 for other camera information or both information displays 106,106a can be combined.

The information display 106 has an indicator 222 that shows the focused distance as a numerical distance, or range of numerical distances (preferably the appropriate hyperfocal range), or as a visualized or highlighted icon or geometric shape. "Highlighting" here refers to any presentation, such as brighter lighting, that makes one of a group of icons more noticable. For verification purposes the depth of field is more important than any particular numerical distance. Thus, an indication of a range of distances or equivalent icon or geometric shape is preferred. The visualized or highlighted icon is preferred for ease of use.

It is important that the focusing distance be provided in direct association with the verifying image in the image display 40. For example, it is preferred that the focusing information display 106a be turned on and off at the same time as the image display. If the focusing information display were on at other times, there would be little value to the information provided and a risk of confusing the photographer. It is preferred that the focusing distance indication and the verifying image be presented to the photographer simultaneously.

Figure 20:
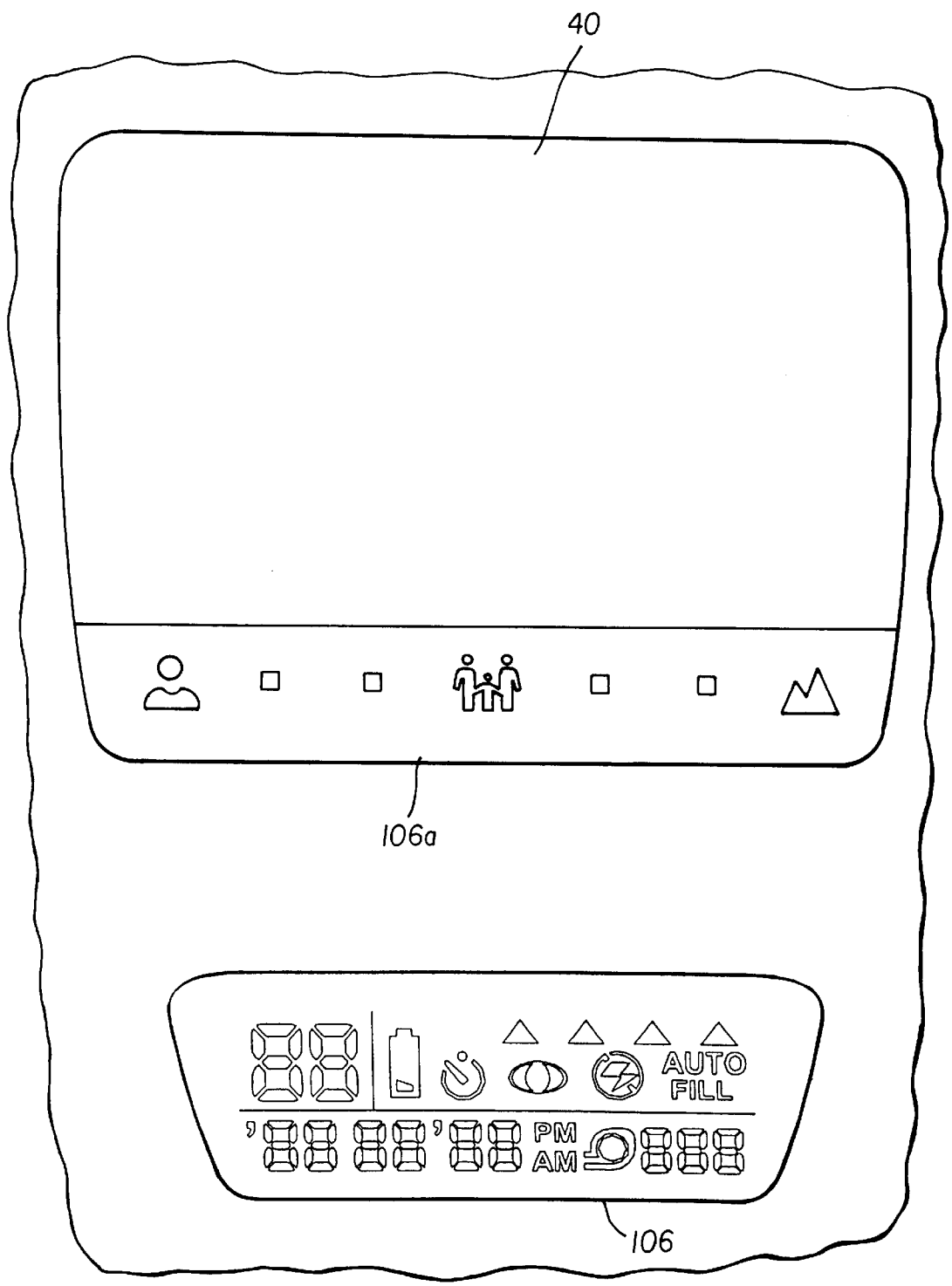
FIG. 20 is a partial enlargement of the back of the camera of FIG. 15 showing the image panel.
Figure 21:
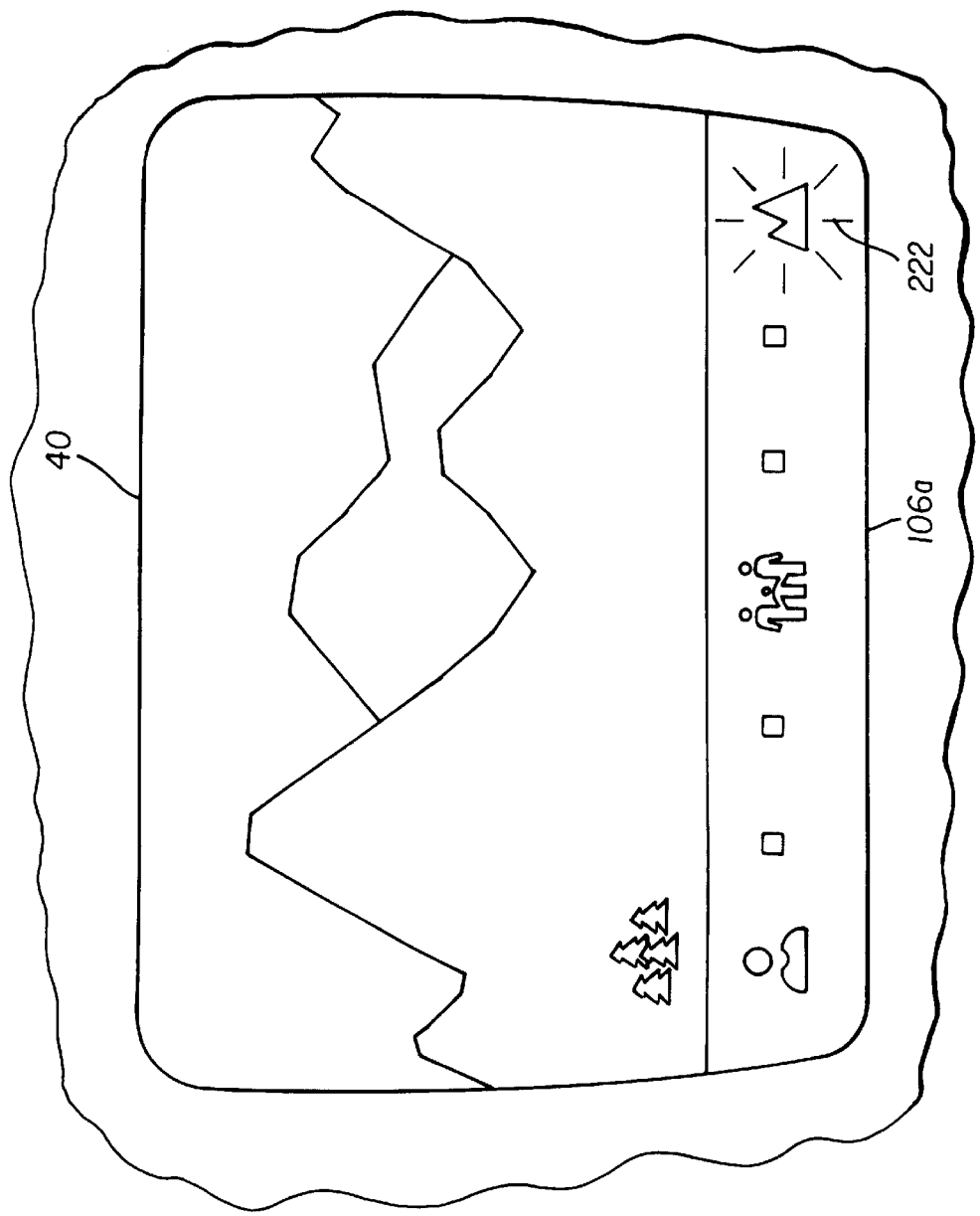
FIG. 21 is the same view as FIG. 20, but during verification of a distant scene showing correct focusing.
Figure 22:
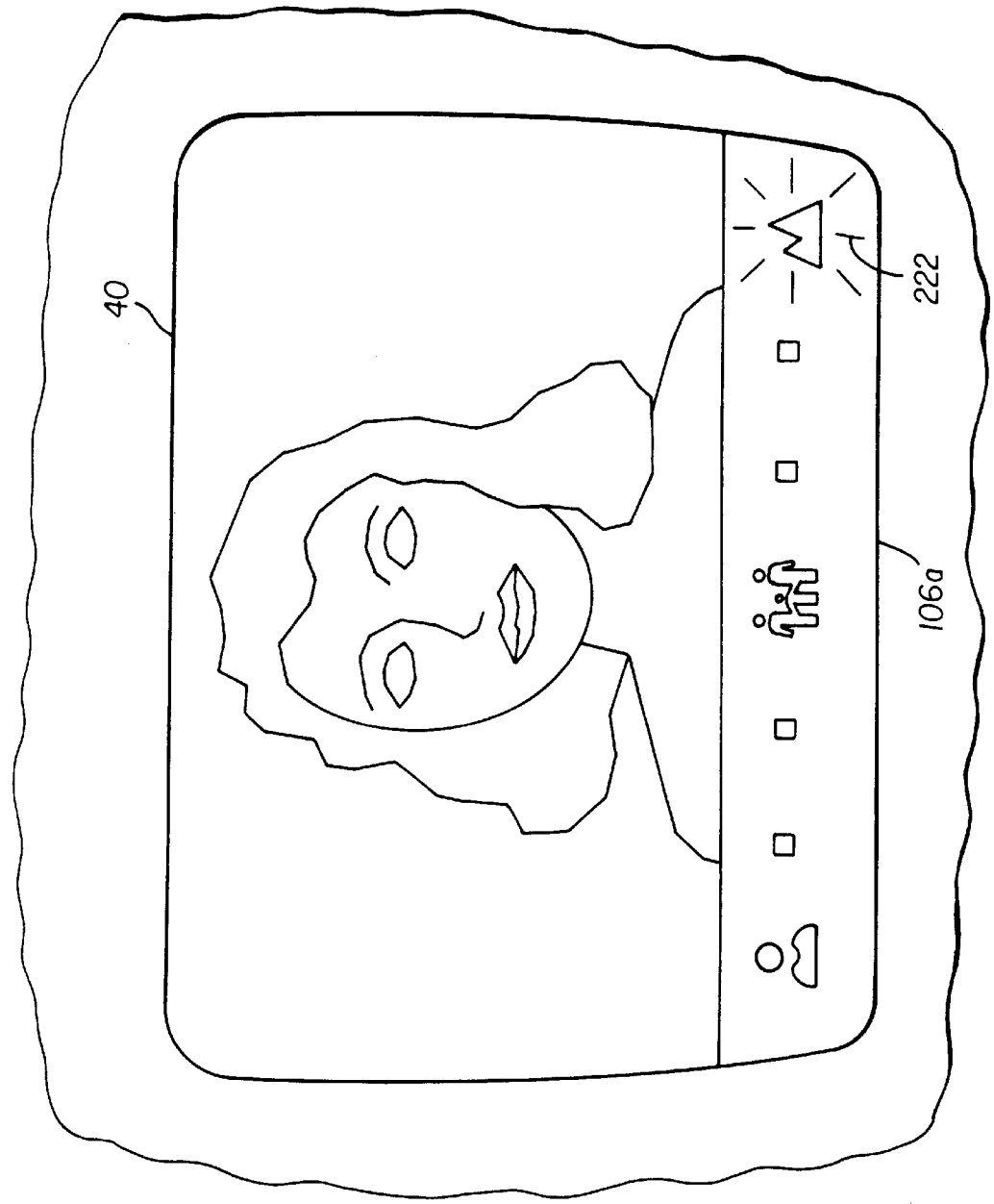
FIG. 22 is the same view as FIG. 20, but during verification of a portrait showing incorrect focusing.
Figure 23:
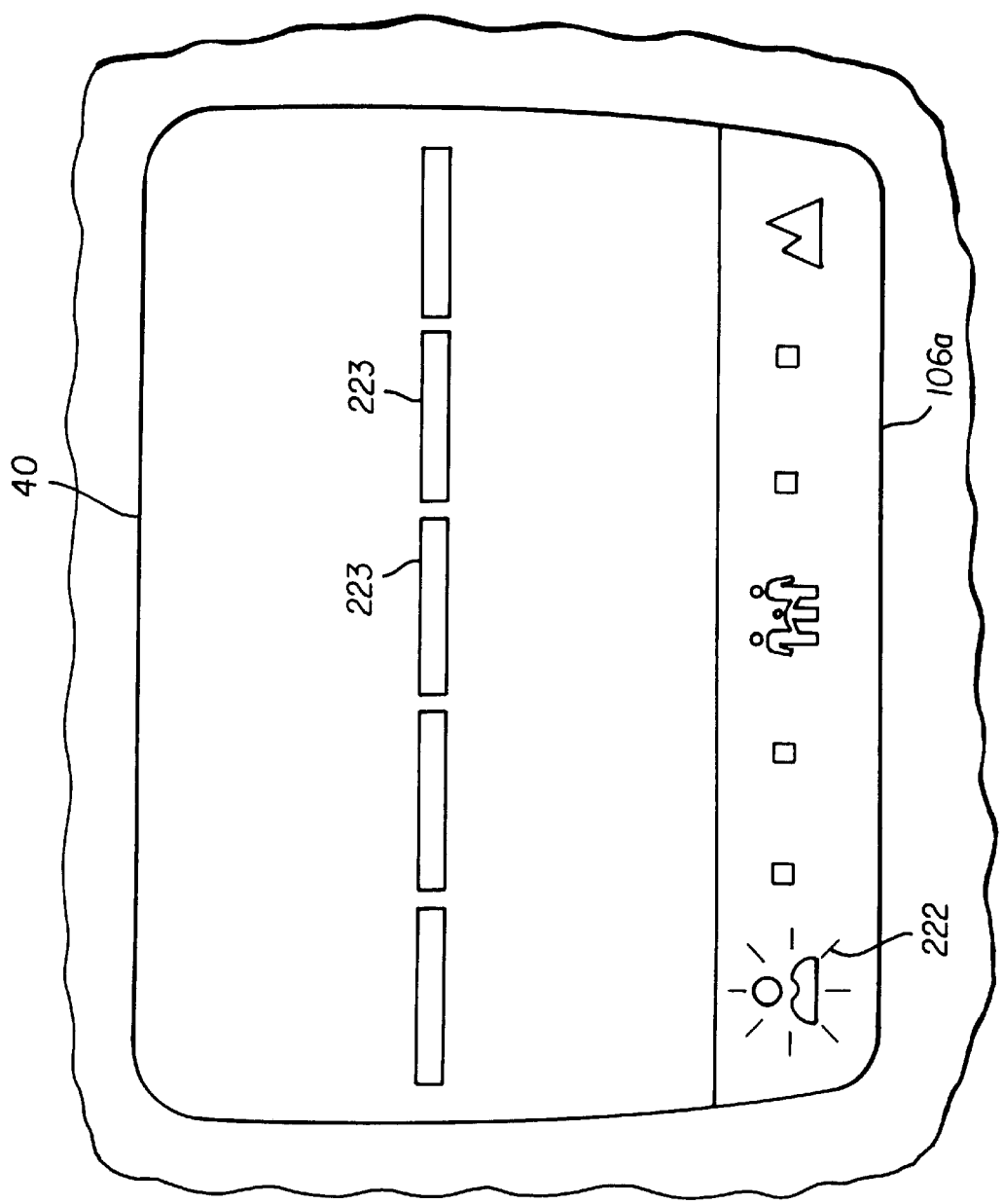
FIG. 23 is a partial enlargement of the back of the camera of FIG. 15 showing the an alternative image panel.
Figure 24:
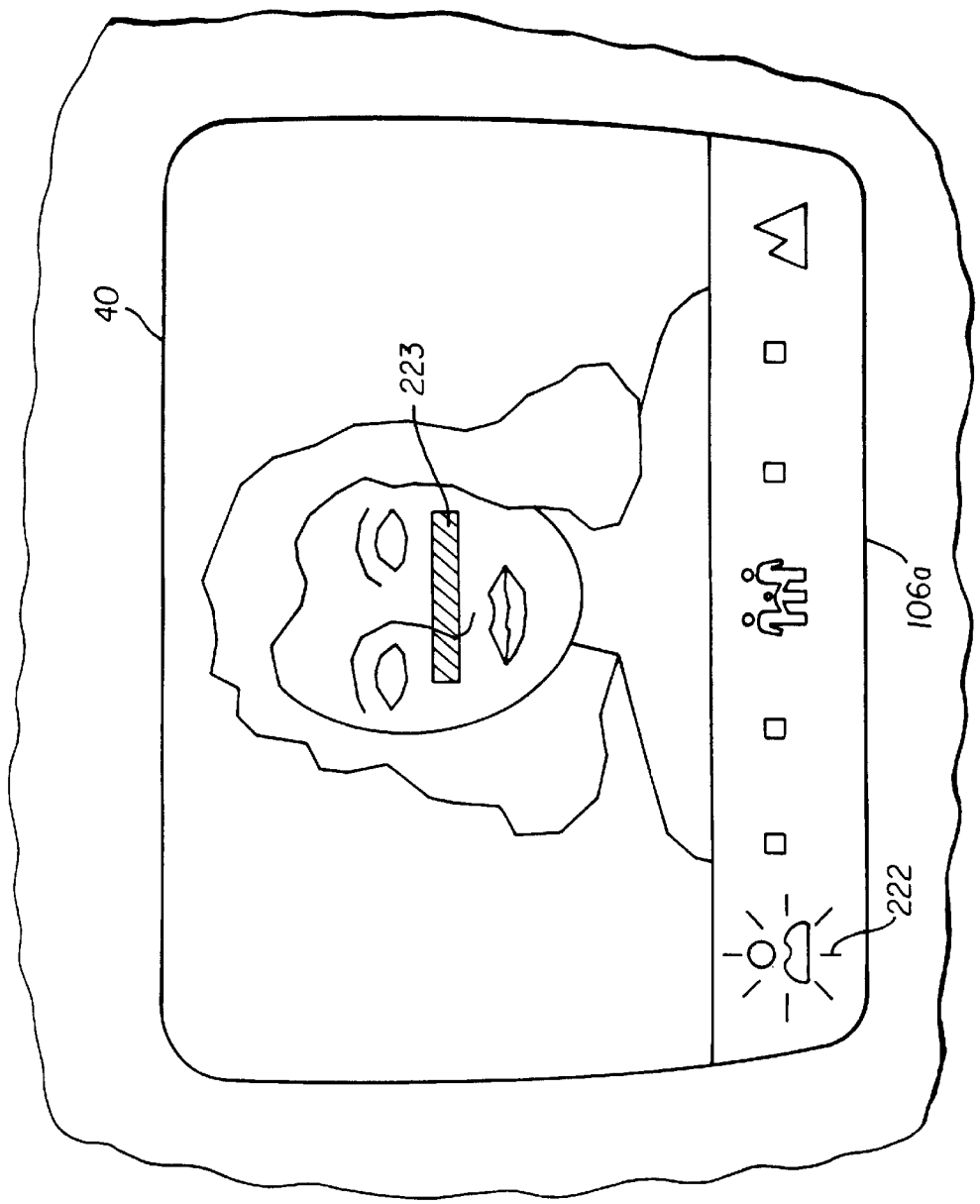
FIG. 24 is the same view as FIG. 23, but during verification of a portrait showing correct focusing.
Figure 25:
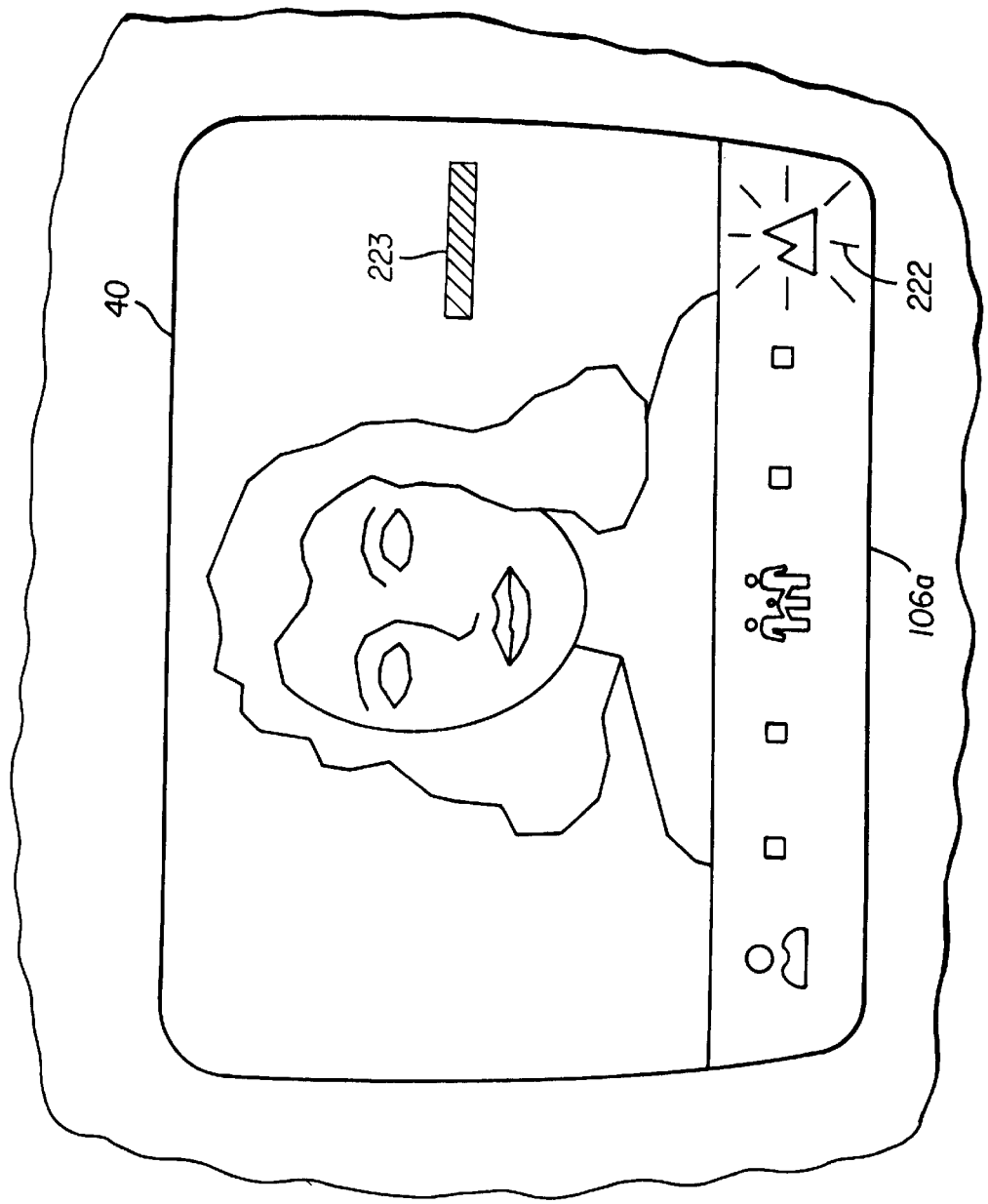
FIG. 25 is the same view as FIG. 23, but during verification of a portrait showing incorrect focusing.
Figure 26:
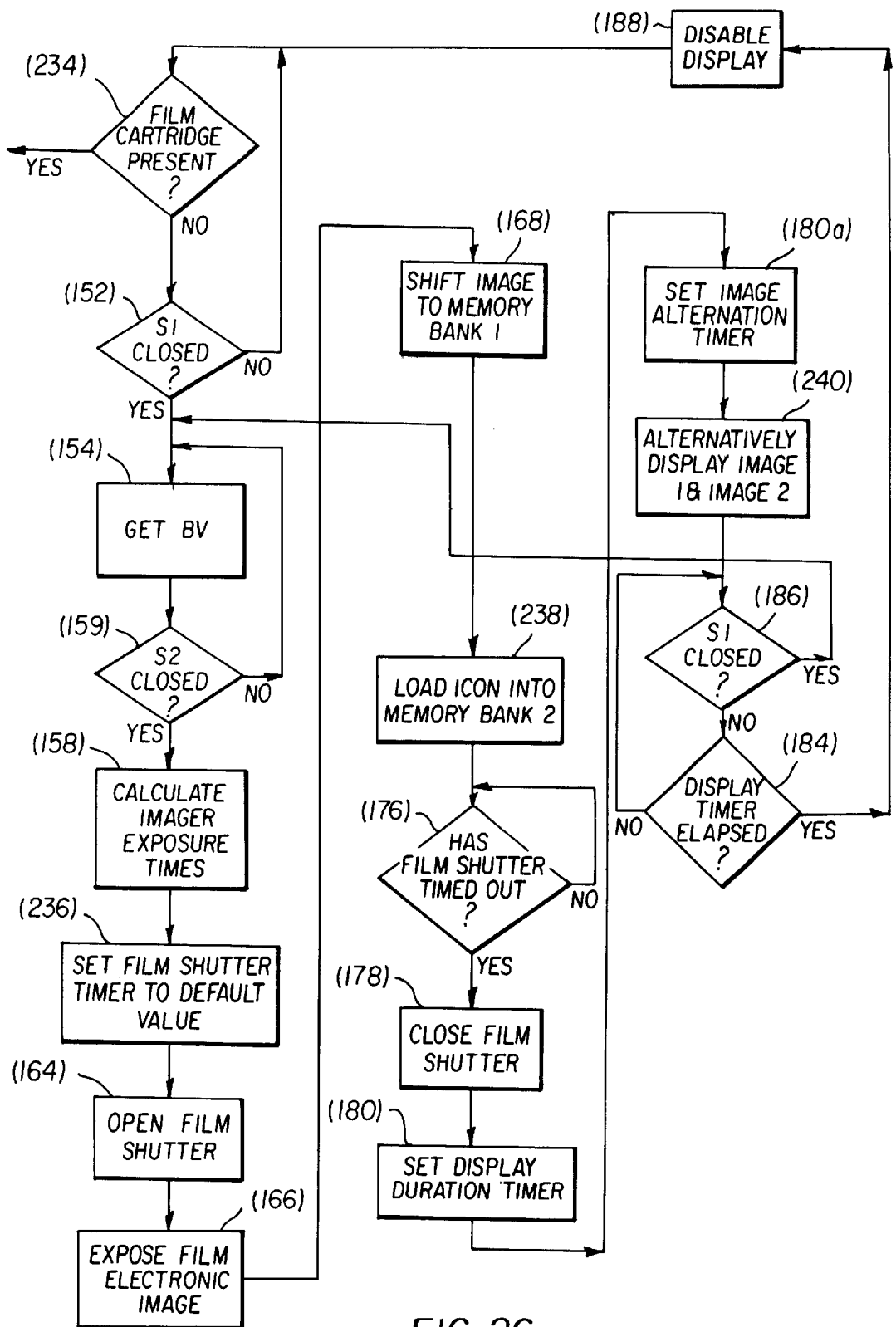
FIG. 26 is a detailed flow chart of an embodiment of the demonstration method.

FIG. 20 illustrates an example of an information panel that includes an image display and two information displays. All picture elements are indicated. FIG. 21 illustrates a similar information panel displaying an image of mountains and having a highlighted icon that indicates focusing at a distance. This can represent, for example, a camera 10 can have a distance/infinity mode in which the autofocusing lens unit is locked at the maximum focused distance. FIG. 22 illustrates what would happen if the camera were then used for portraiture, but focused at infinity. This is possible if the camera was not pointed at the subject when the shutter release was pressed to the first stroke. In this case the image is a portrait and as the highlighted icon indicates, the focused distance is incorrectly set at distance/infinity. FIG. 23 illustrates another information panel. In this case, the picture elements shown include rectangular bars 223 corresponding to sections of the linear array 218. FIG. 24 illustrates a correct focus, in that the image is a portrait and the portrait focusing distance icon is highlighted. The bar 223 over the image shows the portion of the subject image where the subject distance was determined. The location of this bar was stored in memory for verification. FIG. 25 illustrates an incorrect focus. The image is a portrait and the distance/infinity focusing distance icon is highlighted. The bar 223 in the image area indicates that the subject distance was not measured in the portion of the image that includes the likeness of a person.

Figure 19:
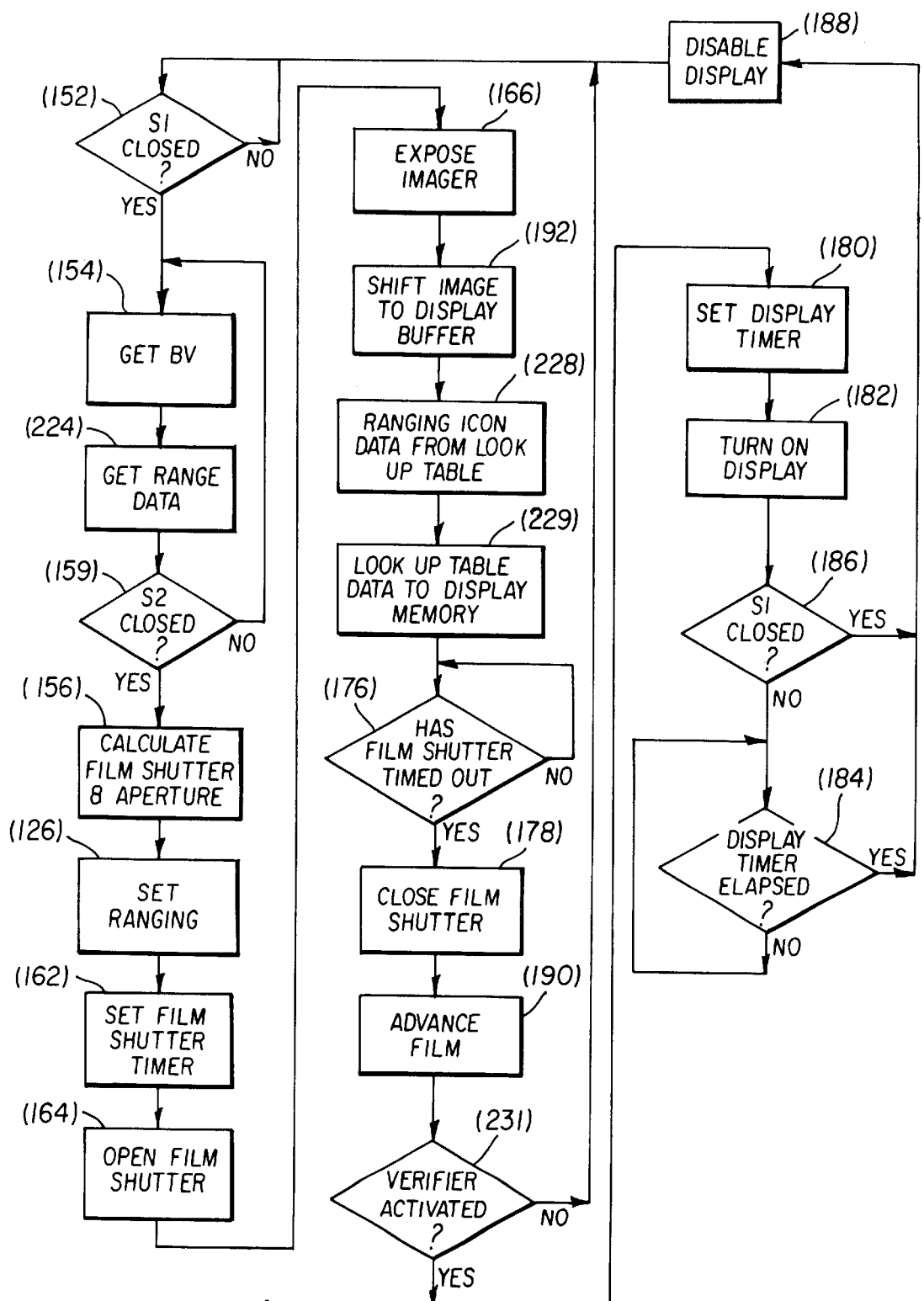
FIG. 19 is a detailed flow chart of an embodiment of the focusing distance verification method.

FIG. 19 illustrates the method of operation of an embodiment of the camera having a focused distance information display. This method is similar to those earlier described, except ranging data (subject distance and focused distance) are determined (224) after the first switch is actuated, the focused distance is set (226) along with other exposure settings, and ranging icon data is obtained (228) from a look up table (not illustrated) and sent (229) as needed to operate the information display. Verifier activation (231), that is, activation of components needed for the image and information displays, is indicated as requiring a separate user action. This can be used in all the methods disclosed herein to limit battery usage, by only providing verification displays on demand.

In a particular embodiment, the camera 10 can have its operation demonstrated when no film unit 18 is present in the camera 10. This is useful for marketing purposes and as a purchaser learns usage of the camera. The camera is preferably as above-described. A non-preferred alternative would lack motion and/or focus verification, but otherwise be similar.

The camera has a film unit detector 230 that switches between a film present state and a film absent state responsive to whether a film unit 18 is present in a film space 232 in the camera body 12 or is absent. The film space 232 adjoins the film chambers 52,54 and the exposure frame 56. The film unit detector 230 signals its state to the controller 100. The controller 100 has a digital representation of a film-unloaded indicator. The camera 10 also includes the combiner 132 and memory 98 earlier discussed.

A wide variety of film unit detectors 230 are known in the art. The simplest is a switch (not shown) having a throw that is tripped by physical interference with the film unit when the film unit is loaded into the camera. Another example, shown in FIG. 2, is an optical detector that is actuated by the presence or absence of a reflected beam from the film unit.

In demonstrating the camera 10 without film 18, the shutter button 26 is first actuated and this is determined (152). The camera 10 detects or has earlier detected that no film unit 18 is present (234). A light value is ascertained (154). The second switch is determined (159) to be closed. An imager exposure time interval is calculated (158). The film shutter is set to a default value (236). The film shutter is opened (164). This is optional, since the film shutter is only actuated in this demonstration mode to provide an appropriate sound that indicates picture taking. The electronic image is exposed (166). The electronic image is stored (168) in a first memory. The controller generates a digital representation of a film-unloaded icon and the digital representation is stored (238) in a second memory. The film shutter timer is checked (176) and the film shutter is closed (178) at the end of the latent image exposure time interval. This sets (108a) a display timer. The electronic image and digital representation are then displayed in alternation (240) in the same manner as the pair of electronic images of the method of FIG. 12. The alternation rate need not be as fast. The display is shown until the display time elapses (184) or the first switch is closed (186), at which time, the display is disabled (188). The demonstration mode can provide motion verification or focus verification or both, as earlier described.

Figure 27:
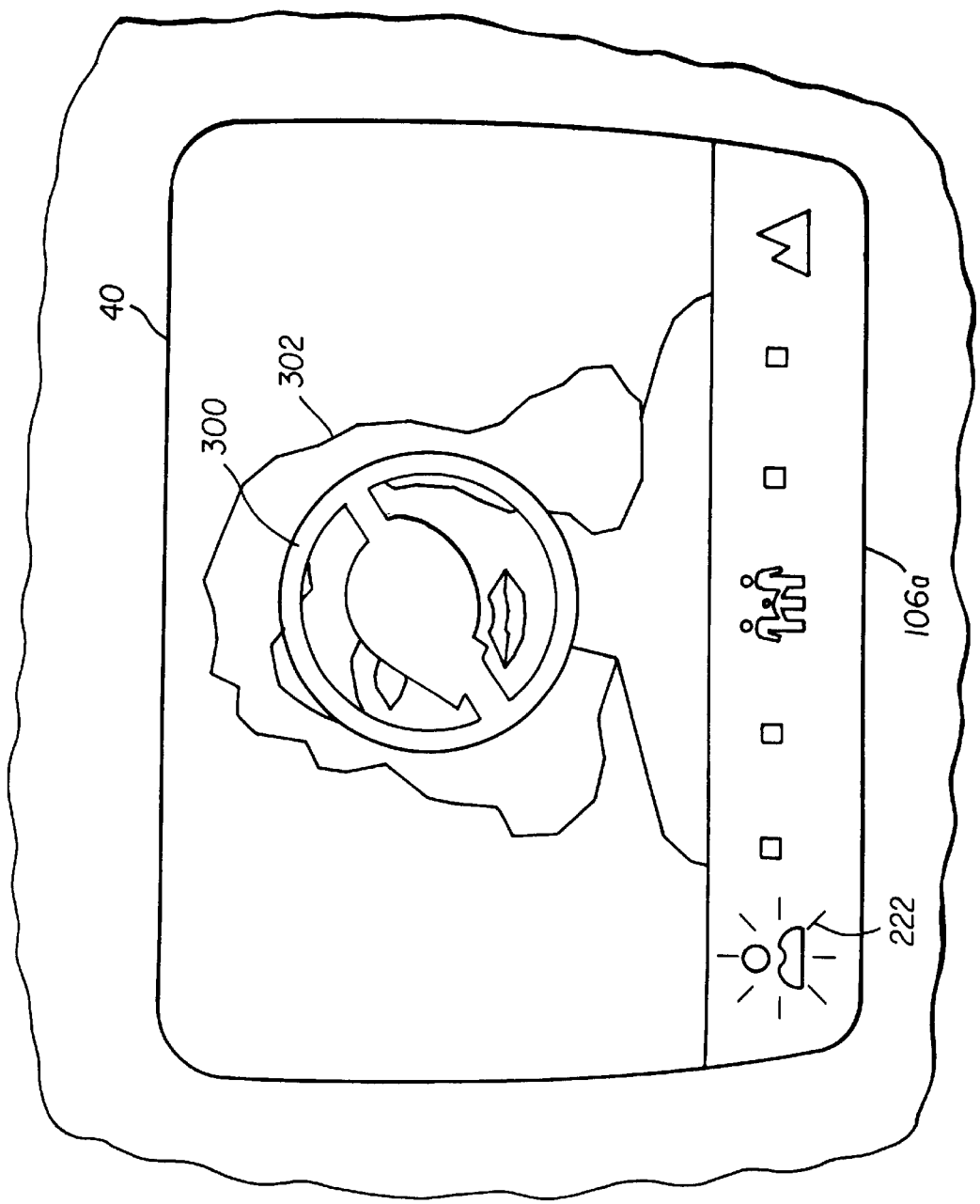
FIG. 27 is a partial enlargement of the back of an embodiment of the camera which provides a demonstration mode.

The demonstration method can alternatively prepare a copy of the electronic image, combine the copy and the digital representation to provide a combined image/representation, and store the combined image/representation in the second memory. The electronic image and the combined image/representation are then shown in alternation in the same manner as earlier described. FIG. 27 illustrates a preferred combined image/representation, in which the representation 300 overlaps the content of the image 302.

The invention has been described in detail with particular reference to certain preferred embodiments thereof, but it will be understood that variations and modifications can be effected within the spirit and scope of the invention.

What is claimed is:

1. A method for demonstrating a film-unloaded verifying camera in response to shutter button actuation, said method comprising the steps of:
   capturing an electronic image;
   showing, said electronic image and a film-unloaded indicator.

2. The method of claim 1 wherein said electronic image and said film-unloaded indicator are shown in alternation.

3. The method of claim 2 further comprising, prior to said showing, generating a digital representation of said film-unloaded indicator and wherein said showing further comprises displaying said electronic image and said digital representation of said film-unloaded indicator.

4. The method of claim 1 further comprising actuating a film shutter concurrent with said capturing.

5. The method of claim 4 further comprising setting said film shutter to a default film shutter exposure time prior to said actuating.

6. The method of claim 1 further comprising prior to said capturing step:
   ascertaining a scene light value;
   determining an electronic exposure time interval responsive to said light value.
   setting a default film exposure time interval; and
   actuating a film shutter for said default exposure time interval concurrent with said capturing.

7. The method of claim 6 further comprising, prior to said capturing, determining that a film unit is absent.

8. A method for demonstrating a film-unloaded verifying camera in response to shutter button actuation, said method comprising the steps of:

capturing an electronic image;

generating a copy of said electronic image;

generating a digital representation of a film-unloaded indicator;

combining said copy of said electronic image and said digital representation of said film-unloaded indicator to produce a resultant image;

showing, said electronic image and said resultant image, in alternation.

9. The method of claim 8 further comprising actuating a film shutter concurrent with said capturing.

10. The method of claim 9 further comprising setting said film shutter to a default film shutter exposure time prior to said actuating.

11. The method of claim 9 further comprising prior to said capturing step:

ascertaining a scene light value;

determining an electronic exposure time interval responsive to said light value.

setting a default film exposure time interval; and actuating a film shutter for said default exposure time interval concurrent with said capturing.

12. The method of claim 11 further comprising, prior to said capturing, determining that a film unit is absent.

13. A verifying camera for use with a film unit, said camera comprising:

a body having a film space for said film unit and an exposure frame adjoining said film space;

a film unit detector disposed in operative relation to said film space, said detector being switchable between a film present state and a film absent state;

an electronic array imager disposed in said body;

an optical system directing light to said exposure frame and said electronic array imager;

a film shutter shuttering said exposure frame;

an imager shutter shuttering said imager;

a shutter button capable of selectively switching from a set state to a released state;

a display mounted on said body;

a controller operatively connecting said shutter release to said shutters, said controller, responsive to said switching when said film unit detector is in said film absent state, momentarily opening said imager shutter to capture an electronic image, said controller having a digital representation of a film-unloaded indicator, said controller transmitting said electronic image and said digital representation to said display.

14. The camera of claim 13 further comprising a first memory capable of storing said electronic image and a second memory capable of storing said digital representation.

15. The camera of claim 13 wherein said electronic image and said digital representation each include a respective set of pixel values, and said camera further comprises a combiner capable of combining said electronic image and said digital representation by adding together respective pixel values of said sets of pixel values of said electronic image and said digital representation to provide a set of pixel values of a combined image.

* * * * *